US012672030B2

(12) United States Patent
Ma

(10) Patent No.: US 12,672,030 B2
(45) Date of Patent: Jun. 30, 2026

(54) SERVICE DATA FLOW TRANSMISSION METHOD, COMMUNICATION APPARATUS, AND COMMUNICATION SYSTEM

(71) Applicant: HUAWEI TECHNOLOGIES CO., LTD., Shenzhen (CN)

(72) Inventor: Jingwang Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 354 days.

(21) Appl. No.: 18/360,286

(22) Filed: Jul. 27, 2023

(65) Prior Publication Data

US 2023/0370897 A1     Nov. 16, 2023

Related U.S. Application Data

(63) Continuation of application No. PCT/CN2021/074242, filed on Jan. 28, 2021.

(51) Int. Cl.
H04W 28/08 (2023.01)
H04W 72/1273 (2023.01)

(52) U.S. Cl.
CPC ... H04W 28/0992 (2020.05); H04W 72/1273 (2013.01)

(58) Field of Classification Search
None
See application file for complete search history.

(56) References Cited

U.S. PATENT DOCUMENTS

2020/0259896 A1     8/2020 Sachs et al.
2020/0329441 A1*   10/2020 Ha ........................... H04J 3/067

FOREIGN PATENT DOCUMENTS

WO         2020010088 A1      1/2020

OTHER PUBLICATIONS

3rd Generation Partnership Project; Technical Specification Group Services and System Aspects; System architecture for the 5G System (5GS); Stage 2 (Release 16), 3GPP TS 23.501 V16.7.0 (Dec. 2020), total 450 pages.
IEEE Standard for Local and Metropolitan Area Networks-Bridges and Bridged Networks Amendment 31: Stream Reservation Protocol (SRP) Enhancements and Performance Improvements, IEEE Std 802.1Qcc-2018, Jun. 14, 2018, doi: 10.1109/IEEESTD.2018. 8514112, total 208 pages.

* cited by examiner

*Primary Examiner* — Kouroush Mohebbi
(74) *Attorney, Agent, or Firm* — Rimon PC

(57)     ABSTRACT

Embodiments of this application provide for a service data flow transmission method, a communication apparatus, and a communication system. In the method, a network device obtains, from one or more received data packets, an identifier of a first data packet group, information indicating generation time of the first data packet group, and downlink transmission time window information of the first data packet group. Also in the method, the network device sends a data packet in the first data packet group to an access network device. At least one data packet in the first data packet group is sent together with the identifier of the first data packet group, the information indicating the generation time of the first data packet group, and the downlink transmission time window information of the first data packet group.

18 Claims, 8 Drawing Sheets

SERVICE DATA FLOW TRANSMISSION METHOD, COMMUNICATION APPARATUS, AND COMMUNICATION SYSTEM

CROSS-REFERENCE TO RELATED APPLICATIONS

This application is a continuation of International Application No. PCT/CN2021/074242, filed on Jan. 28, 2021, the disclosure of which is hereby incorporated by reference in its entirety,

TECHNICAL FIELD

Embodiments of this application generally relate to the field of communication technologies, and in particular, to a service data flow transmission method, a communication apparatus, and a communication system.

BACKGROUND

Currently, during downlink transmission, a user plane network element and an access network device typically schedule a service data flow according to a configured scheduling policy at a data packet level of granularity.

However, in some applications, joint scheduling of a plurality of data packets for a same service data flow need to be considered.

SUMMARY

Embodiments of this application provide for a service data flow transmission method, a communication apparatus, and a communication system, to implement joint scheduling of a plurality of data packets of a service data flow.

According to a first aspect, an embodiment of this application provides a service data flow transmission method. The method includes that a network device obtains, from one or more received data packets, an identifier of a first data packet group, information indicating generation time of the first data packet group, and downlink transmission time window information of the first data packet group. The one or more data packets are data packets in the first data packet group of a first service data flow, the first service data flow includes at least two data packet groups, and the first data packet group is one of the at least two data packet groups. The network device sends a data packet in the first data packet group to an access network device. The data packet in the first data packet group is sent together with the identifier of the first data packet group, and at least one data packet in the first data packet group is sent together with the identifier of the first data packet group, the information indicating the generation time of the first data packet group, and the downlink transmission time window information of the first data packet group.

The identifier of the first data packet group, the information indicating the generation time of the first data packet group, and the downlink transmission time window information of the first data packet group may be collectively referred to as related information of the first data packet group. The related information of the first data packet group is used to perform transmission control on the first data packet group, or is used by the access network device to perform transmission control on the first data packet group, or indicates the access network device to perform transmission control on the first data packet group.

Based on the foregoing solution, the network device obtains the related information of the first data packet group, carries the related information of the first data packet group in a data packet in the first data packet group for transmission to the access network device, so that the access network device can perform transmission control on the first data packet group based on the related information of the first data packet group. Therefore, this approach implements transmission control at a data packet group level of granularity, which results in improved data packet transmission efficiency and user experience. In addition, a maximum available duration from the generation of the first data packet group to the transmission of the first data packet group to a terminal device is indicated based on the downlink transmission time window information of the first data packet group. Therefore, one data packet group can be sent to the terminal device in one time window, and a requirement of a low-delay service can be met. This further improves a service experience of a user.

When the related information of the first data packet group is carried in a portion of data packets in the first data packet group (for example, a first data packet or first K data packets in the first data packet group), and the related information of the first data packet group is not carried in another portion of the data packets in the first data packet group, overheads caused by transmission of the related information of the first data packet group can be reduced.

In a possible implementation of the method, the network device receives the one or more data packets from an application function network element.

In a possible implementation of the method, the network device caches N data packets in the first data packet group, where N is an integer greater than 1. That the network device sends a data packet in the first data packet group to an access network device includes that the network device obtains the N cached data packets, and sends the N data packets to the access network device.

Based on the method, this helps avoid a traffic impact caused when the access network device receives a large quantity of data packets from the network device in a short time period, or a resource waste caused when the access network device does not receive a data packet from the network device in a long time period.

In a possible implementation of the method, the network device obtains quantity information of the first data packet group from the one or more received data packets, and the network device determines a quantity N of cached data packets in the first data packet group based on the quantity information of the first data packet group.

In a possible implementation of the method, the network device determines a cache time of the N data packets based on the information indicating the generation time of the first data packet group and the downlink transmission time window information of the first data packet group.

In a possible implementation of the method, the network device obtains quantity information of the first data packet group from the one or more received data packets. The network device obtains, from one or more received data packets in a second data packet group of a second service data flow, an identifier of the second data packet group, quantity information of the second data packet group, information indicating generation time of the second data packet group, and downlink transmission time window information of the second data packet group. The network device determines a scheduling priority of the first data packet group based on the quantity information of the first data packet group, the quantity information of the second data packet group, the information indicating the generation time of the first data packet group, the information indicating the generation time of the second data packet group, the downlink transmission time window information of the first data packet group, and the downlink transmission time window information of the second data packet group. That the network device sends a data packet in the first data packet group to an access network device includes that the network device sends the data packet in the first data packet group to the access network device based on the scheduling priority of the first data packet group.

Based on the foregoing solution, when a plurality of terminal devices have different processing capabilities, the plurality of terminal devices may be controlled by the network device, so that synchronization between the plurality of terminal devices can be maintained, thereby improving a service experience of the user. In addition, one data packet group may be sent to the terminal device in one time window, so that a requirement of a low-delay service can be met, and service experience of the user can be further improved.

In a possible implementation of the method, that the network device determines the scheduling priority of the first data packet group based on the quantity information of the first data packet group, the quantity information of the second data packet group, the downlink transmission time window information of the first data packet group, and the downlink transmission time window information of the second data packet group includes that the network device determines a processing time of the first data packet group based on the quantity information of the first data packet group and a rate of the first service data flow. The network device also determines a remaining transmission time of the first data packet group based on the processing time of the first data packet group, the information indicating the generation time of the first data packet group, and the downlink transmission time window information of the first data packet group. The network device determines the processing time of the second data packet group based on the quantity information of the second data packet group and a rate of the second service data flow. The network device also determines the remaining transmission time of the second data packet group based on the processing time of the second data packet group, the information indicating the generation time of the second data packet group, and the downlink transmission time window information of the second data packet group. The network device determines the scheduling priority of the first data packet group based on the remaining transmission time of the first data packet group and the remaining transmission time of the second data packet group.

In a possible implementation of the method, the network device receives indication information, where the indication information indicates performing transmission control on the first service data flow at a data packet group level of granularity. For example, the indication information is from a session management network element, a policy control network element, or the like.

According to a second aspect, an embodiment of this application provides a service data flow transmission method that includes that an access network device obtains information indicating a generation time of a first data packet group and downlink transmission time window information of the first data packet group from at least one received data packet. The at least one received data packet is a data packet in the first data packet group of a first service data flow, the first service data flow includes at least two data packet groups, and the first data packet group is one of the at least two data packet groups. The access network device determines a remaining transmission time of the first data packet group based on the information indicating the generation time of the first data packet group and the downlink transmission time window information of the first data packet group. The access network device sends the data packet in the first data packet group to a terminal device based on the remaining transmission time of the first data packet group.

Based on the foregoing solution, the access network device obtains related information of the first data packet group, so that transmission control can be performed on the first data packet group based on the related information of the first data packet group. Therefore, this approach implements transmission control at a data packet group level of granularity, which thereby improves data packet transmission efficiency and user experience. In addition, a maximum available duration from a generation of the first data packet group to a transmission of the first data packet group to a terminal device is indicated based on the downlink transmission time window information of the first data packet group. Therefore, one data packet group can be sent to the terminal device in one time window, and a requirement of a low-delay service can be met. This further improves service experience of a user.

In a possible implementation of the method, the access network device obtains quantity information of the first data packet group from the at least one received data packet. The access network device determines, based on the quantity information of the first data packet group and the remaining transmission time of the first data packet group, a modulation and coding scheme corresponding to the first data packet group. That the access network device sends the data packet in the first data packet group to the terminal device based on the remaining transmission time of the first data packet group includes that the access network device sends the data packet in the first data packet group to the terminal device based on the modulation and coding scheme corresponding to the first data packet group and the remaining transmission time of the first data packet group.

In a possible implementation of the method, that the access network device determines, based on the quantity information of the first data packet group and the remaining transmission time of the first data packet group, the modulation and coding scheme corresponding to the first data packet group includes that the access network device determines, based on the quantity information of the first data packet group and the remaining transmission time of the first data packet group, a first modulation and coding scheme corresponding to a first portion of data packets received earlier in the first data packet group and a second modulation and coding scheme corresponding to a second portion of the data packets received later in the first data packet group. A level of the first modulation and coding scheme is lower than a level of the second modulation and coding scheme. That the access network device sends the data packet in the first data packet group to the first terminal device based on the modulation and coding scheme corresponding to the first data packet group and the remaining transmission time of the first data packet group includes that the access network device sends the first portion of the data packets in the first data packet group to the terminal device based on the first modulation and coding scheme and the remaining transmission time of the first data packet group. The access network device sends the second portion of the data packets in the first data packet group to the terminal device based on the second modulation and coding scheme and the remaining transmission time of the first data packet group.

In a possible implementation of the method, the access network device obtains, from the at least one received data packet, information indicating a generation time of a second data packet group and downlink transmission time window information of the second data packet group, where the at least one received data packet is a data packet in the second data packet group of a second service data flow. The access network device determines a remaining transmission time of the second data packet group based on the information indicating the generation time of the second data packet group and the downlink transmission time window information of the second data packet group. The access network device determines a scheduling priority of the first data packet group based on the remaining transmission time of the first data packet group and the remaining transmission time of the second data packet group. That the access network device sends the data packet in the first data packet group to the terminal device based on the remaining transmission time of the first data packet group includes that the access network device sends the data packet in the first data packet group to the terminal device based on the scheduling priority of the first data packet group and the remaining transmission time of the first data packet group.

Based on the foregoing solution, when a plurality of terminal devices have different processing capabilities, the plurality of terminal devices may be controlled by the access network device, so that synchronization between the plurality of terminal devices can be maintained, thereby improving a service experience of the user. In addition, one data packet group may be sent to the terminal device in one time window, so that a requirement of a low-delay service can be met, and service experience of the user can be further improved.

In a possible implementation of the method, the access network device receives indication information, where the indication information indicates performing transmission control on the first service data flow at a data packet group level of granularity. The indication information is from a session management network element, a network device, a policy control network element, or the like.

According to a third aspect, an embodiment of this application provides a service data flow transmission method. The method includes an application function network element that generates an identifier of a first data packet group of a first service data flow, information indicating generation time of the first data packet group, and downlink transmission time window information of the first data packet group, the first service data flow includes at least two data packet groups, and the first data packet group is one of the at least two data packet groups. The application function network element sends a data packet in the first data packet group to a network device, where the data packet in the first data packet group is sent together with the identifier of the first data packet group, and one or more data packets in the first data packet group carry the identifier of the first data packet group, the information indicating the generation time of the first data packet group, and the downlink transmission time window information of the first data packet group.

Based on the foregoing solution, the application function network element generates related information of the first data packet group, where the related information of the first data packet group indicates characteristic information of the first data packet group; and carries the related information of the first data packet group in one or more data packets in the first data packet group for transmission to the network device. In this way, the network device can perform transmission control on the first data packet group based on the related information of the first data packet group. Therefore, this approach implements transmission control at data packet group granularity, and helps improve data packet transmission efficiency and user experience. In addition, a maximum available duration from generation of the first data packet group to transmission of the first data packet group to a terminal device is indicated based on the downlink transmission time window information of the first data packet group. Therefore, one data packet group can be sent to the terminal device in one time window, and a requirement of a low-delay service can be met. This further improves service experience of a user.

In a possible implementation method, the one or more data packets in the first data packet group further include quantity information of the first data packet group.

In a possible implementation method, the application function network element determines the downlink transmission time window information of the first data packet group based on a generation time of perception data of the terminal device, estimated duration of processing the first data packet group by the terminal device, and the generation time of the first data packet group.

According to a fourth aspect, an embodiment of this application provides a communication apparatus. The apparatus may be a network device, or may be a chip used in a network device. The apparatus has a function of implementing any implementation of the method of the first aspect. The function may be implemented by hardware, or may be implemented by hardware executing corresponding software. The hardware or the software includes one or more modules corresponding to the function.

According to a fifth aspect, an embodiment of this application provides a communication apparatus. The apparatus may be an access network device, or may be a chip used in an access network device. The apparatus has a function of implementing any implementation of the method of the second aspect. The function may be implemented by hardware, or may be implemented by hardware executing corresponding software. The hardware or the software includes one or more modules corresponding to the function.

According to a sixth aspect, an embodiment of this application provides a communication apparatus. The apparatus may be an application function network element, or may be a chip used in an application function network element. The apparatus has a function of implementing any implementation of the method of the third aspect. The function may be implemented by hardware, or may be implemented by hardware executing corresponding software. The hardware or the software includes one or more modules corresponding to the function.

According to a seventh aspect, an embodiment of this application provides a communication apparatus, including a processor and a memory. The memory is configured to store computer instructions. When the apparatus runs, the processor executes the computer instructions stored in the memory, so that the apparatus performs any implementation of the method in the first aspect to the third aspect.

According to an eighth aspect, an embodiment of this application provides a communication apparatus, including a unit (e.g., circuit) or means configured to perform the steps in any implementation of the method of the first aspect to the third aspect.

According to a ninth aspect, an embodiment of this application provides a communication apparatus, including a processor and an interface circuit. The processor is configured to communicate with another apparatus through the interface circuit, and perform any implementation of the method of the first aspect to the third aspect. There are one or more processors.

According to a tenth aspect, an embodiment of this application provides a communication apparatus, including a processor configured to be communicatively coupled to a memory. The processor is configured to invoke a program stored in the memory, to perform any implementation of the method in the first aspect to the third aspect. The memory may be located inside or outside the apparatus. In addition, there are one or more processors.

According to an eleventh aspect, an embodiment of this application further provides a computer-readable storage medium. The computer-readable storage medium stores instructions. When the instructions are run on a computer, any implementation of the method of the first aspect to the third aspect is performed.

According to a twelfth aspect, an embodiment of this application further provides a computer program product. The computer program product includes a computer program. When the computer program is run, any implementation of the method of the first aspect to the third aspect is performed.

According to a thirteenth aspect, an embodiment of this application further provides a chip system that includes a processor that is configured to perform any implementation of the method in the first aspect to the third aspect.

According to a fourteenth aspect, an embodiment of this application further provides a communication system, including a network device configured to perform any implementation of the method in the first aspect, and an access network device configured to perform any implementation of the method in the second aspect.

In a possible implementation of the method, the communication system further includes an application function network element configured to perform any implementation of the method in the third aspect.

According to a fifteenth aspect, an embodiment of this application further provides a communication system, including a network device configured to perform any implementation of the method in the first aspect, and an application function network element configured to perform any implementation of the method in the third aspect.

BRIEF DESCRIPTION OF DRAWINGS

FIG. 1(*b*) is a schematic diagram of a communication system according to an embodiment of this application;

FIG. 2(*b*) is a schematic diagram of a 5G network architecture based on a point-to-point interface;

DESCRIPTION OF EMBODIMENTS

Figures 1A, 1B, 2A:
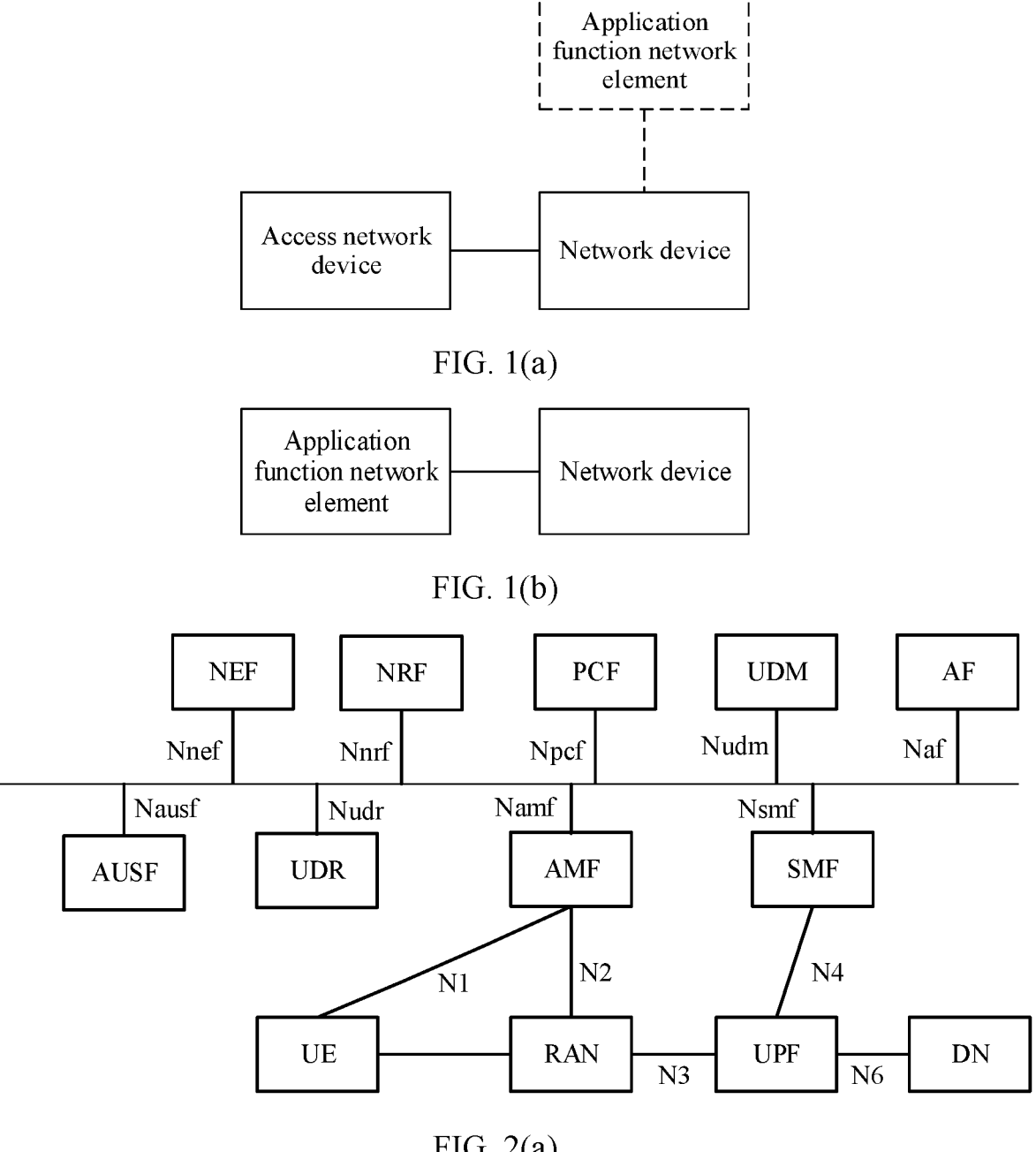
FIG. 1(*a*) is a schematic diagram of a communication system according to an embodiment of this application.
FIG. 2(*a*) is a schematic diagram of a fifth generation (5G) network architecture based on a service-based architecture.

To make the objectives, technical solutions, and advantages of this application clear, the following description further describes this application in detail with reference to the accompanying drawings. An operation method in a method embodiment may also be applied to an apparatus embodiment or a system embodiment. In the descriptions of this application, unless otherwise specified, "a plurality of" means two or more than two.

To jointly schedule a plurality of data packets of a service data flow, as shown in FIG. 1(*a*), this application provides a communication system. The system includes an access network device and a network device. Optionally, the system further includes an application function network element.

The network device is configured to obtain, from one or more received data packets, an identifier of a first data packet group, information indicating a generation time of the first data packet group, and downlink transmission time window information of the first data packet group. The one or more data packets are data packets in the first data packet group of a first service data flow, the first service data flow includes at least two data packet groups, and the first data packet group is one of the at least two data packet groups. The network device is configured to send a data packet in the first data packet group to the access network device. The data packet in the first data packet group is sent together with the identifier of the first data packet group, and at least one data packet in the first data packet group is sent together with the identifier of the first data packet group, the information indicating the generation time of the first data packet group, and the downlink transmission time window information of the first data packet group.

The access network device is configured to receive the data packet in the first data packet group from the network device.

Implementations of the foregoing solution are described in detail in the following method embodiments. Details are not described herein.

The system shown in FIG. 1(*a*) may be used in a 5th generation (5G) network architecture shown in FIG. 2(*a*) or FIG. 2(*b*), or certainly may be used in a future network architecture, for example, a 6th generation (6G) network architecture. This is not limited in this application.

To jointly schedule a plurality of data packets of a service data flow, as shown in FIG. 1(*b*), this application provides a communication system. The system includes an application function network element and a network device.

The system shown in FIG. 1(*b*) may be used in a 5G network architecture shown in FIG. 2(*a*) or FIG. 2(*b*), or certainly may be used in a future network architecture, for example, a 6G network architecture. This is not limited in this application.

The application function network element is configured to generate an identifier of a first data packet group of a first service data flow, information indicating generation time of the first data packet group, and downlink transmission time window information of the first data packet group. The first service data flow includes at least two data packet groups, and the first data packet group is one of the at least two data packet groups. The application function network element is configured to send a data packet in the first data packet group to the network device, where the data packet in the first data packet group is sent together with the identifier of the first data packet group, and one or more data packets in the first data packet group carry the identifier of the first data packet group, the information indicating the generation time of the first data packet group, and the downlink transmission time window information of the first data packet group. The network device is configured to obtain, from one or more received data packets, the identifier of the first data packet group, the information indicating the generation time of the first data packet group, and the downlink transmission time window information of the first data packet group.

For example, it is assumed that the communication system shown in FIG. 1(a) or FIG. 1(b) is used in a 5G network architecture. FIG. 2(a) is a schematic diagram of a 5G network architecture based on a service-based architecture. A network element or an entity corresponding to the network device in FIG. 1(a) or FIG. 1(b) may be a user plane function (UPF) network element in the 5G network architecture shown in FIG. 2(a). A network element or an entity corresponding to the access network device in FIG. 1(a) may be a radio access network (RAN) device in the 5G network architecture shown in FIG. 2(a). A network element or an entity corresponding to the application function network element in FIG. 1(a) or FIG. 1(b) may be an application function (AF) network element in the 5G network architecture shown in FIG. 2(a).

The 5G network architecture shown in FIG. 2(a) may include three parts: a terminal device, a data network (DN), and a carrier network. The following briefly describes functions of some of the network elements.

The carrier network may include one or more of the following network elements: an authentication server function (AUSF) network element, a network exposure function (NEF) network element, and a policy control function (PCF) network element, a unified data management (UDM), a unified data repository (UDR), a network repository function (NRF) network element, an access and mobility management function (AMF) network element, a session management function (SMF) network element, a RAN network element, a UPF network element, and the like. In the foregoing carrier network, a part other than the radio access network may be referred to as a core network.

It should be noted that the AF network element shown in FIG. 2(a) may be an AF network element in the carrier network, or may be an AF network element (such as a third-party server or the like) outside the carrier network.

During implementation, the terminal device in embodiments of this application may be a device configured to implement a wireless communication function. The terminal device may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR)

terminal device, a wireless terminal in industrial control, a wireless terminal in self-driving, a wireless terminal in telemedicine (e.g., remote medical), a wireless terminal in a smart grid, a wireless terminal in transportation safety, a wireless terminal in a smart city, a wireless terminal in a smart home, or the like. The terminal may be mobile or fixed.

The terminal device may establish a connection to the carrier network through an interface (for example, N1) provided by the carrier network, and use services such as data and/or voice provided by the carrier network. The terminal device may further access a DN through the carrier network, and use a carrier service deployed on the DN and/or a service provided by a third party. The third party may be a service provider other than the carrier network and the terminal device, and may provide another service such as a data service and/or a voice service for the terminal device. A representation form of the third party may be determined based on an actual application scenario. This is not limited in this application.

The RAN is a sub-network of the carrier network, and is an implementation system between a service node in the carrier network and the terminal device. To access the carrier network, the terminal device first passes through the RAN, and may be connected to the service node in the carrier network through the RAN. The RAN device in this application is a device that provides the wireless communication function for the terminal device, and the RAN device is also referred to as an access network device. The RAN device in this application includes but is not limited to: a next generation NodeB (gNodeB, gNB), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like in 5G.

The AMF network element performs functions such as mobility management and access authentication/authorization. In addition, the AMF network element is responsible for transferring a user policy between the UE and the PCF.

The SMF network element performs functions such as session management, execution of a control policy delivered by the PCF, UPF selection, and UE Internet protocol (IP) address assignment.

The UPF network element serves as an interface UPF connecting to the data network, and implements functions such as user plane data forwarding, charging statistics based on a session/flow level, and bandwidth throttling.

The UDM network element is responsible for functions such as subscription data management and user access authorization.

The UDR is responsible for a function of accessing subscription data, policy data, application data, and another type of data.

The NEF network element is configured to support capability and event exposure.

The AF network element transfers a requirement of an application side on a network side, for example, a quality of service (QoS) requirement or user status event subscription. The AF may be a third-party functional entity, or may be an operator-deployed application service, for example, an IP multimedia subsystem (IMS) voice call service. The AF network element may also be referred to as an application server.

The PCF network element is responsible for policy control functions such as charging for a session level or a service data flow level, a QoS bandwidth guarantee, mobility management, and UE policy decision.

The NRF network element may be configured to provide a network element discovery function, and provide, based on a request from another network element, network element information corresponding to a network element type. The NRF further provides a network element management service, for example, registration, update, and deregistration of a network element and subscription and push of a network element status.

The AUSF network element is responsible for authenticating a user, to determine whether the user or a device is allowed to access a network.

The DN is a network outside the carrier network. The carrier network may access a plurality of DNs. A plurality of services may be deployed in the DN, and the DN may provide services such as a data service and/or a voice service for the terminal device. For example, the DN may be a private network of a smart factory, a sensor installed in a workshop of the smart factory may be a terminal device, a control server of the sensor is deployed in the DN, and the control server may serve the sensor. The sensor may communicate with the control server, to obtain instructions of the control server, transmit collected sensor data to the control server based on the instructions, and the like. For another example, the DN is an internal office network of a company, a mobile phone or a computer of an employee of the company may be a terminal device, and the mobile phone or the computer of the employee may access information, data resources, and the like in the internal office network of the company.

Nausf, Nnef, Npcf, Nudm, Naf, Namf, Nsmf, N1, N2, N3, N4, and N6 in FIG. 2(a) are interface serial numbers. For meanings of the interface serial numbers, refer to meanings defined in a 3GPP standard protocol. This is not limited herein.

Figure 2B:
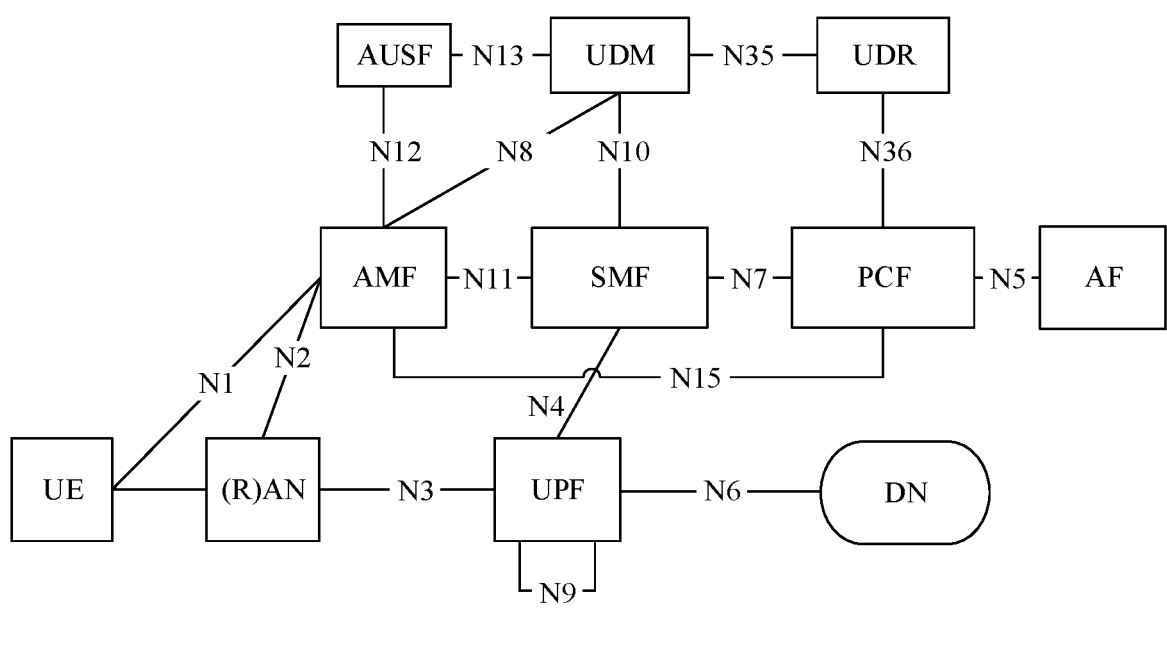

For example, it is assumed that the communication system shown in FIG. 1(a) is used in a 5G network architecture. FIG. 2(b) is a schematic diagram of a service-based 5G network architecture. A network element or an entity corresponding to the network device in FIG. 1(a) or FIG. 1(b) may be a UPF network element in the 5G network architecture shown in FIG. 2(b). The network element or entity corresponding to the access network device in FIG. 1(a) may be a RAN device in the 5G network architecture shown in FIG. 2(b). The network element or entity corresponding to the application function network element in FIG. 1(a) or FIG. 1(b) may be an AF network element in the 5G network architecture shown in FIG. 2(b).

For descriptions of functions of network elements in FIG. 2(b), refer to the descriptions of the functions of the corresponding network elements in FIG. 2(a). Details are not described again. A difference between FIG. 2(b) and FIG. 2(a) lies in that an interface between the network elements in FIG. 2(b) is a point-to-point interface, and an interface between the network elements in FIG. 2(a) is a service-based interface.

In the architecture shown in FIG. 2(b), names and functions of the interfaces between the network elements are as follows:

(1) N7 represents an interface between a PCF and an SMF, and is configured to deliver a control policy at a granularity of protocol data unit (PDU) session and a control policy at a level of granularity of a service data flow.

(2) N15 represents an interface between the PCF and an AMF, and is configured to deliver a UE policy and an access control related policy.

(3) N5 represents an interface between an AF and the PCF, and is configured to deliver an application service request, and report a network event.

(4) N4 represents an interface between the SMF and a UPF, and is configured to transfer information between a control plane and a user plane, including delivering a forwarding rule, a QoS control rule, a traffic statistics rule, and the like from the control plane to the user plane, and reporting user plane information.

(5) N11 represents an interface between the SMF and the AMF, and is configured to transfer PDU session tunnel information between the RAN and the UPF, transfer a control message to be sent to UE, transfer radio resource control information to be sent to the RAN, and the like.

(6) N2 represents an interface between the AMF and the RAN, and is configured to transfer radio bearer control information from a core network side to the RAN, and the like.

(7) N1 represents an interface between the AMF and the UE, is access-irrelevant, and is configured to transfer a QoS control rule to the UE, and the like.

(8) N8 represents an interface between the AMF and a UDM, and is used by the AMF to obtain access and mobility management related subscription data and authentication data from the UDM, used by the AMF to register current mobility management related information of the UE with the UDM, and the like.

(9) N10 represents an interface between the SMF and the UDM, and is used by the SMF to obtain session management related subscription data from the UDM, used by the SMF to register current session related information of the UE with the UDM, and the like.

(10) N35 represents an interface between the UDM and a UDR, and is used by the UDM to obtain user subscription data information from the UDR.

(11) N36 represents an interface between the PCF and the UDR, and is used by the PCF to obtain policy related subscription data and application data related information from the UDR.

(12) N12 represents an interface between the AMF and the AUSF, and is used by the AMF to initiate an authentication process to the AUSF, where the authentication process may carry a subscription concealed identifier (SUCI) as a subscription identifier.

(13) N13 represents an interface between the UDM and the AUSF, and is used by the AUSF to obtain a user authentication vector from the UDM, to perform the authentication process.

It may be understood that the network elements or the functions may be network elements in a hardware device, software functions running on dedicated hardware, or virtualized functions instantiated on a platform (for example, a cloud platform). Optionally, the network elements or the functions may be implemented by one device, may be implemented by a plurality of devices, or may be one functional module in one device. This is not limited in embodiments of this application.

The session management network element, the network device, the access network device, and the application function network element in embodiments of this application may be respectively the SMF, the UPF, the RAN, and the AF in FIG. 2(a) or FIG. 2(b), or may be network elements that have functions of the SMF, the UPF, the RAN, and the AF in a future communication network such as a 6G network. This is not limited in this application. For ease of description, this application is described by using an example in which the session management network element, the network device, the access network device, and the application function network element are respectively the SMF, the UPF, the RAN, and the AF.

It should be noted that, with the development of communication technologies, names of the actors/elements utilized during the data transmission method in embodiments of this application, for example, an application function network element, a network device, or an access network device, may also change accordingly. However, the name change does not affect a technical essence of the solutions of this application. Therefore, when only the name of the execution body is changed, the protection scope of the solutions in this application is not affected.

In an existing QoS model, when the UPF receives a downlink data packet, the UPF encapsulates data packets having a same reliability requirement into a same QoS flow by using a filter in a packet detection rule (PDR) preconfigured by the SMF. A plurality of QoS flows may exist in a same PDU session, but each QoS flow has an independent and unique QoS flow identifier (QFI), and each QoS flow is associated with one QoS profile. The network side uses, based on parameters in the QoS profile, a same QoS guarantee, such as a delay, a forwarding priority, and a packet loss rate, for data packets belonging to a same QoS flow.

When the RAN receives a downlink QoS flow from the UPF, the RAN encapsulates a plurality of QoS flows into a same data radio bearer (DRB) according to a mapping rule, and the same DRB enjoys a same air interface side reliability guarantee.

Currently, during downlink transmission, the UPF and the RAN schedule a service data flow at a data packet level of granularity according to a configured scheduling policy. However, in some applications, joint scheduling of a plurality of data packets of a same service data flow needs to be considered.

The following uses an augmented reality (AR) application scenario as an example for description.

An AR application is a potential major application that is supported by a 5G network and can be used in an individual consumer scenario, such as a real-time augmented reality experience in exhibition halls and education scenarios. Other applications include games that utilize AR game or a conference involving a plurality of participants. The AR can also be used for business scenario-oriented applications, such as during AR auxiliary component assembly.

A service process in a single-person AR scenario is used as an example. A complete process of interaction between a terminal device and an AR server (where the AR server is an example of an AF) includes the following processes:

At a moment T1, the terminal device generates perception data (for example, including user head action information, user field of view information, and a real-time image or video), and sends the perception data to the AR server by using the RAN and the UPF.

It may be considered that a time interval between generating the perception data and sending the perception data by the terminal device is negligible, and may be ignored.

At a moment T2, the AR server receives the perception data and starts to process the perception data.

The processing of the perception data includes, for example, rendering the perception data such as the user head action information and the user field of view information to generate corresponding AR media data, and performing an encoding for the corresponding AR media data to obtain an AR object.

At a moment T3, the AR server completes processing of the perception data and generates a data packet group, where the data packet group includes a plurality of data packets. Then, the data packet group is sent to the terminal device by using the UPF and the RAN.

It may be considered that a time interval between generating the data packet group and sending the data packet group by the AR server is negligible, and may be ignored.

At a moment T4, the terminal device receives the data packet group, and starts to process (for example, including decoding and presentation) data packets in the data packet group.

At a moment T5, the terminal device completes processing of a data packet in a data packet group.

So far, a complete process of interaction between the terminal device and the AR server is completed.

Relationships between a service data flow, an AR object, and a data packet group are as follows:

One AR object may correspond to one data packet group, and one data packet group includes a plurality of data packets. For example, one AR object is one table, and the AR object may correspond to one data packet group.

Alternatively, one AR object may correspond to a plurality of data packet groups. For example, one AR object is one table, where a front portion of the table corresponds to one data packet group, a back portion corresponds to another data packet group, and the like.

Alternatively, a plurality of AR objects correspond to one data packet group. For example, one AR object is one table, and another AR object is a chair, where the table and the chair correspond to one data packet group. In other words, the data packet group is used to transmit data packets corresponding to the table and the chair.

Alternatively, a portion of each of the plurality of AR objects corresponds to one data packet group. For example, one AR object is one table, and another AR object is a chair, where a front face of the table and a front face of the chair correspond to one data packet group. Alternatively, a front face of the table and the chair correspond to one data packet group. Alternatively, a front face of the chair and the table correspond to one data packet group.

In other words, one data packet group in some embodiments may correspond to a portion or all of one or more AR objects.

One service data flow includes one or more data packet groups, one data packet group includes a plurality of data packets, and the data packet group may be indicated by using an identifier of the data packet group. Different data packet groups of a same service data flow may have a same identifier or different identifiers. For example, two adjacent data packet groups have different identifiers, and two non-adjacent data packet groups may have a same identifier or different identifiers.

One service data flow may be used to transmit a data packet group corresponding to one or more AR objects.

It should be noted that some embodiments are not limited to a relationship between a service data flow, a data packet group, and an AR object, and may be determined based on an implementation.

It should be noted that an AR object in an AR service is used as an example for description. For another application scenario, some embodiments are also applicable.

To ensure service experience of a user, currently, it is generally required that time from the terminal device starting to report perception data (namely, the moment T1) to the terminal device completing processing of a data packet in a data packet group (namely, the moment T5) does not exceed a preset maximum delay (for example, 70 ms). In different interaction processes between the terminal device and the AR server, time spent in uplink transmission of different perception data (namely, a difference between T2 and T1) may be different, time spent by the AR server in generating a data packet group after processing the different perception data (namely, a difference between T3 and T2) may be different, and time spent by the terminal device in processing data packets in different data packet groups (namely, a difference between T5 and T4) may also be different. In this way, remaining time (namely, a difference between T4 and T3) used for downlink transmission of the different data packet groups may be different in the different interaction processes.

For example, it is assumed that the preset maximum delay is 70 ms. In an interaction process, uplink transmission of the perception data takes 6 ms, it is estimated that it takes 4 ms for the terminal device to process a data packet in a data packet group, and it takes 50 ms for the AR server to generate the data packet group after processing the perception data. Therefore, remaining time for downlink transmission of the data packet group is 10 ms. In other words, the AR server needs to send the generated data packet group to the terminal device by using the UPF and the RAN within 10 ms.

In another interaction process, uplink transmission of the perception data takes 6 ms, it is estimated that it takes 4 ms for the terminal device to process a data packet in a data packet group, and it takes 45 ms for the AR server to generate the data packet group after processing the perception data. Therefore, remaining time for downlink transmission of the data packet group is 15 ms. In other words, the AR server needs to send the generated data packet group to the terminal device by using the UPF and the RAN within 15 ms.

It can be learned that, in the foregoing example, joint scheduling needs to be considered for a plurality of data packets of one service data flow, so that the plurality of data packets can reach the terminal device in one time window, thereby ensuring service experience of the user. In addition, a size of the time window is variable, that is, for different interaction processes, the size of the time window may be different.

In addition, in an AR application scenario involving a plurality of participants, because processing capabilities of different terminal devices are different, the different terminal devices may be asynchronous. A multi-player AR game is used as an example. A plurality of terminal devices participating in the game separately report obtained perception data to an AR server. The AR server generates a data packet group based on the one or more pieces of received perception data, and simultaneously sends the data packet group to the plurality of terminal devices. However, because processing capabilities of different terminal devices are different, displaying images by the different terminal devices may have a time difference, that is, images viewed at the same time are different. Therefore, in this scenario, joint scheduling of a plurality of data packets of a service data flow also needs to be considered, so that the different terminal devices maintain synchronization (for example, synchronously displaying an image or synchronously receiving a voice), to ensure service experience of a user.

In some embodiments, the service data flow is a data flow of a service from an AF (for example, a third-party server), for example, a media service data flow. The service data flow includes a video service data flow, a voice service data flow, and the like.

Figure 3:
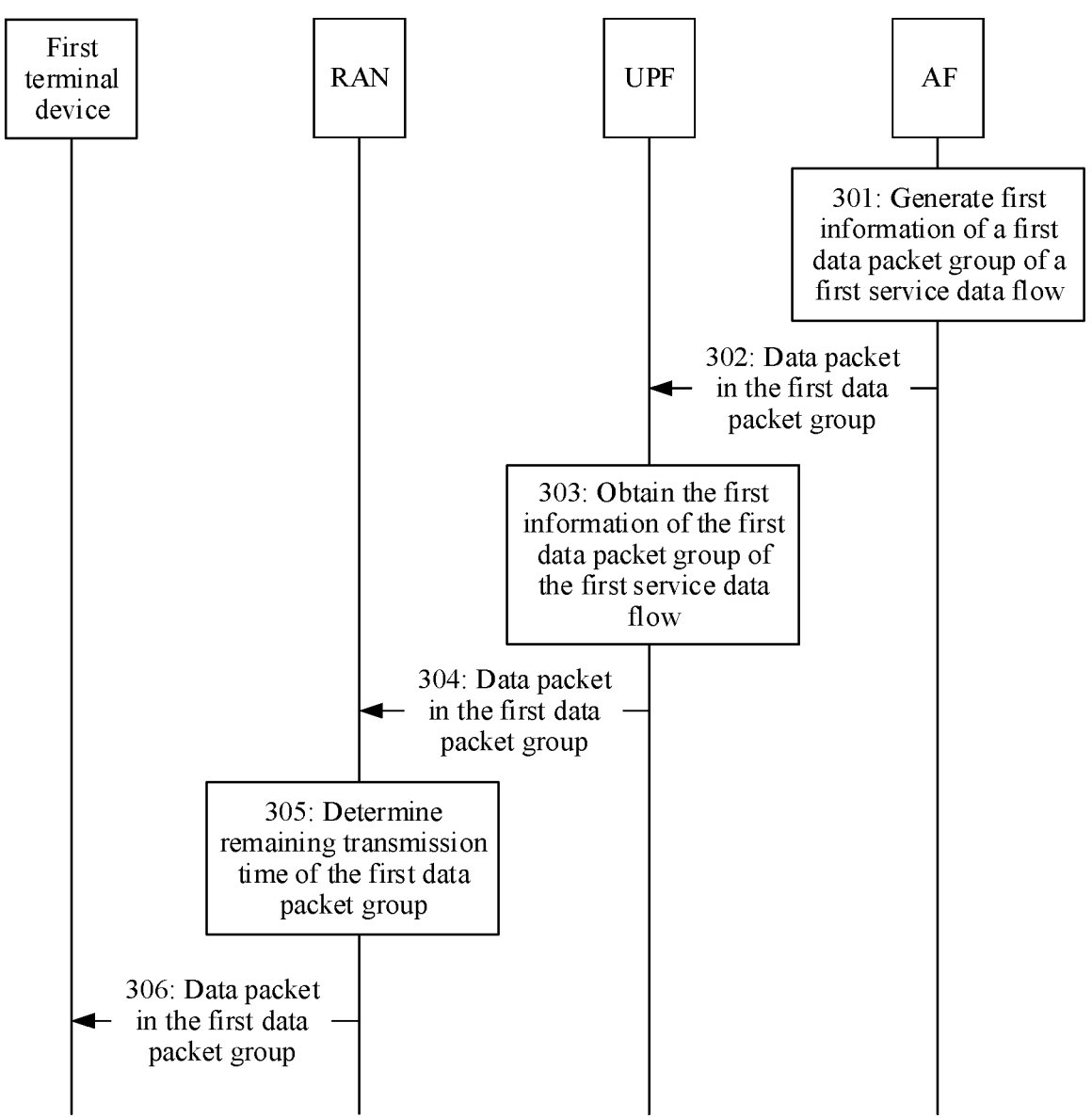
FIG. 3 is a schematic diagram of a service data flow transmission method according to an embodiment of this application.

FIG. 3 is a schematic diagram of a service data flow transmission method according to an embodiment of this application. The method includes the following steps.

Step 301: An AF generates first information of a first data packet group of a first service data flow.

For example, the AF herein may be an AR server in an AR application, or may be another third-party server, or the like.

The first service data flow is a service data flow between the AF and a first terminal device. The service data flow includes one or more data packet groups, and one data packet group includes a plurality of data packets. Any data packet group in the first service data flow is referred to as a first data packet group.

The first information includes an identifier of the first data packet group of the first service data flow, information indicating generation time of the first data packet group, and downlink transmission time window information of the first data packet group.

The identifier of the first data packet group is used to identify the first data packet group.

The information indicating the generation time of the first data packet group may be indication information, and the indication information indicates the generation time of the first data packet group, or may be the generation time of the first data packet group (namely, a generation time point). The generation time of the first data packet group is time at which the AF generates the first data packet group after receiving perception data from the first terminal device and processing the perception data.

The downlink transmission time window information of the first data packet group indicating maximum available duration from generation of the first data packet group to transmission of the first data packet group to the first terminal device. For example, the AF may determine the downlink transmission time window information of the first data packet group based on generation time (namely, a generation time point) of the perception data of the first terminal device, estimated duration of processing the first data packet group by the first terminal device, and the generation time of the first data packet group. For example, when the generation time of the perception data of the first terminal device is K1, the first terminal device sends the perception data of the first terminal device to the AF at the moment K1, the AF receives the first data packet group at K2, the generation time of the first data packet group is K3, the estimated duration of processing the first data packet group by the first terminal device is LL and a preset maximum delay is L2, then a maximum available duration from generation of the first data packet group to a transmission of the first data packet group to the first terminal device is equal to $L2-L1-(K2-K1)-(K3-K2)$; where K2-K1 represents an uplink transmission duration of sending the perception data of the first terminal device to the AF from the first terminal device, and K3-K2 represents a duration spent by the AF from starting to process the perception data of the first terminal device to generating the first data packet group based on the perception data.

Optionally, the first information further includes quantity information of the first data packet group. The quantity information of the first data packet group indicates a quantity of the first data packet groups. The quantity information of the first data packet group may be indication information, where the indication information indicates the quantity information of the first data packet group, or may be a quantity of the first data packet groups, or may alternatively include a total size of the first data packet group and a size of each data packet. The quantity of the first data packet groups may be obtained through calculation based on the total size of the first data packet group and the size of each data packet.

Step 302: The AF sends a data packet in the first data packet group to a UPF, and correspondingly, the UPF receives the data packet in the first data packet group.

The first data packet group includes a plurality of data packets, and some or all of the plurality of data packets carry the first information. For example, a packet header of a first data packet may be (for example, a real-time transport protocol (RTP) header) carries the first information.

In an implementation of the method, each data packet in the first data packet group carries the first information.

In an implementation of the method, each data packet in the first data packet group carries some information in the first information. For example, some data packets carry the identifier of the first data packet group and the information indicating the generation time of the first data packet group, and other data packets carry the downlink transmission time window information of the first data packet group and the quantity information of the first data packet group. For another example, some data packets carry the identifier of the first data packet group and the information indicating the generation time of the first data packet group, some data packets carry the downlink transmission time window information of the first data packet group, other data packets carry the quantity information of the first data packet group, and the like.

In another implementation of the method, the first data packet or first K data packets in the first data packet group carry the first information, another data packet carries the identifier of the first data packet group, where K is an integer greater than 1. Based on the method, the first information is carried in some data packets in the first data packet group (namely, the first data packet or the first K data packets in the first data packet group), and some information (namely, the identifier of the first data packet group) in the first information is carried in other data packets in the first data packet group, so that overheads caused by transmission of the first information can be reduced. For example, the first data packet group includes 60 data packets, packet headers (such as RTP headers) of first five data packets carry the first information, and packet headers of last 55 data packets carry the identifier of the first data packet group.

In another implementation method, each of first X data packets in the first data packet group carries some information in the first information, another data packet carries the identifier of the first data packet group, where X is an integer greater than 1. For example, the first data packet group includes 60 data packets, where a packet header (for example, an RTP header) of the first data packet carries the identifier of the first data packet group and the information indicating the generation time of the first data packet group, a packet header of a second data packet carries the identifier of the first data packet group and the downlink transmission time window information of the first data packet group, a packet header of a third data packet carries the identifier of the first data packet group and the quantity information of the first data packet groups, and packet headers of the other 57 data packets carry the identifier of the first data packet group. For another example, the first data packet group includes 60 data packets, where a packet header (for example, an RTP header) of the first data packet carries the identifier of the first data packet group, the information indicating the generation time of the first data packet group, and the downlink transmission time window information of the first data packet group, a packet header of the second data packet carries the identifier of the first data packet group and the information indicating the generation time of the first data packet group, a packet header of a third data packet carries the identifier of the first data packet group and the downlink transmission time window information of the first data packet group, a packet header of a fourth data packet carries the identifier of the first data packet group and the quantity information of the first data packet groups, packet headers of the other 56 data packets carry the identifier of the first data packet group, and the like.

Based on step 301 and step 302, the AF generates the first information, where the first information indicates characteristic information of a data packet group. The AF then carries the first information in a data packet in the first data packet group for transmission to the UPF, so that the UPF can perform transmission control on the first data packet group based on the first information. Therefore, this implements a transmission control at a data packet group level of granularity, which thereby improves data packet transmission efficiency and user experience.

Step 303: The UPF obtains the first information of the first data packet group of the first service data flow.

For example, the UPF may obtain the first information from one or more received data packets. The one or more data packets are data packets in the first data packet group of the first service data flow.

Optionally, before step 303, the UPF may further receive indication information from an SMF, a PCF, or another network element. The indication information indicates to the UPF to perform transmission control on the first service data flow by data packet group. Therefore, the UPF performs step 303 based on the indication information.

Step 304: The UPF sends a data packet in the first data packet group to a RAN, and correspondingly, the RAN receives the data packet in the first data packet group.

At least one data packet that is in the first data packet group and that is sent by the UPF to the RAN carries the first information. For example, the UPF may carry the first information in all data packets that are in the first data packet group and that are sent to the RAN, or carry the first information in the first data packet, or carry the first information in first M data packets, where M is an integer greater than 1. Herein, M may be the same as or different from K described above.

Optionally, the first information may be carried in a packet header of a data packet in the first data packet group. The packet header herein may be, for example, a GPRS tunneling protocol (GTP) header, where GPRS is short for general packet radio service. For example, the first data packet group includes 60 data packets, packet headers (for example, GTP headers) of a first 10 data packets carry the first information, and packet headers of a last 50 data packets carry the identifier of the first data packet group.

It should be noted that, after receiving the data packet in the first data packet group from the AF, the UPF may add a GTP header to the data packet, where the GTP header may carry the first information or carry the identifier of the first data packet group. Then, the UPF sends the data packet in the first data packet group to the RAN. In other words, the data packet in the first data packet group sent by the UPF to the RAN may carry the first information or the identifier of the first data packet group at an RTP layer, and also carry the first information or the identifier of the first data packet group at a GTP layer. Therefore, it may be understood that each data packet in the first data packet group received by the UPF from the AF is sent to the RAN together with the identifier of the first data packet group. In other words, each data packet sent to the RAN carries at least the identifier of the first data packet group. In addition, one or more data packets that are in the first data packet group and that are received by the UPF from the AF are sent to the RAN together with the first information. In other words, the UPF may add the first information to only some received data packets in the first data packet group, and then send the received data packets to the RAN.

Certainly, in another implementation method, the UPF may alternatively delete the first information or the identifier of the first data packet group from the RTP header, and carry the first information or the identifier of the first data packet group in only the GTP header.

The RAN may perform integrity transmission control on the first data packet group based on the received first information.

Optionally, when receiving the data packet in the first data packet group, the UPF does not immediately send the data packet to the RAN, but caches a plurality of received data packets, and then sends the plurality of cached data packets to the RAN at a specific rate. For example, the UPF caches N data packets in the first data packet group, where N is an integer greater than 1. Then, the UPF obtains the N cached data packets and sends the N data packets to the RAN. Based on the method, this helps avoid a traffic impact caused when the RAN receives a large quantity of data packets from the UPF in a short time period, or a resource waste caused when the RAN does not receive a data packet from the UPF in a long time period.

In an implementation of the method, the UPF may determine, based on the quantity information of the first data packet group, a quantity of cached data packets in the first data packet group, namely, a size of N. For example, it is preconfigured on the UPF that caching is performed based on a proportion of 50% of a data packet group. That is, each time the UPF receives 50% of a data packet group, the UPF caches the data packet once, and then obtains the cached data packet for sending. Therefore, the UPF may determine that N is equal to a quantity of first data packet groups×50%.

In an implementation of the method, the UPF may determine the cache time of the N data packets based on the information indicating the generation time of the first data packet group and the downlink transmission time window information of the first data packet group. For example, the UPF may determine a remaining transmission time of the first data packet group based on the information indicating the generation time of the first data packet group and the downlink transmission time window information of the first data packet group, and then determine the cache time of the N data packets based on the remaining transmission time of the first data packet group. For example, a specified proportion of the remaining transmission time of the first data packet group is determined as the cache time of the N data packets.

For example, the downlink transmission time window information of the first data packet group indicates that the AF needs to send the first data packet group to the first terminal device within 20 ms, the information indicating the generation time of the first data packet group indicates that the AF generates and sends the first data packet group at a moment P1, and the UPF receives the first data packet group at a moment P2. Therefore, the UPF needs to send the first data packet group to the first terminal device within duration of 20–(P2–P1), where P2–P1 represents a delay experienced when the first data packet group is transmitted from the AF to the UPF. The remaining transmission time of the first data packet group is equal to 20-(P2–P1). It should be noted that the remaining transmission time of the first data packet group herein further includes time of processing the first data packet group inside the UPF. Then, the UPF determines the cache time of the N data packets based on the remaining transmission time of the first data packet group. For example, when the specified proportion is 10%, it may be determined that the cache time of the N data packets=(20–(P2–P1))×10%.

Based on the foregoing step 303 and step 304, the UPF obtains the first information, carries the first information in a data packet in the first data packet group for transmission to the RAN, so that the RAN can perform transmission control on the first data packet group based on the first information. Therefore, this approach implements transmission control at a data packet group level of granularity, which thereby improve data packet transmission efficiency and user experience. In addition, a maximum available duration from a generation of the first data packet group to a transmission of the first data packet group to a terminal device is indicated based on the downlink transmission time window information of the first data packet group. Therefore, one data packet group can be sent to the terminal device in one time window, and a requirement of a low-delay service can be met. This further improves service experience of a user.

Step 305: The RAN determines the remaining transmission time of the first data packet group based on the information indicating the generation time of the first data packet group and the downlink transmission time window information of the first data packet group.

For example, the downlink transmission time window information of the first data packet group indicates that the AF needs to send the first data packet group to the first terminal device within 20 ms, the information indicating the generation time of the first data packet group indicates that the AF generates and sends the first data packet group at the moment P1, and the RAN receives the first data packet group at a moment P3. Therefore, the RAN needs to send the first data packet group to the first terminal device within duration of 20–(P3–P1), where P3–P1 represents a delay experienced when the first data packet group is transmitted from the AF to the RAN. That is, the remaining transmission time of the first data packet group is equal to 20–(P3–P1).

The remaining transmission time of the first data packet group herein refers to a maximum available duration in which the RAN transmits the first data packet group to the first terminal device. In addition, the remaining transmission time of the first data packet group further includes a time of processing the first data packet group inside the RAN.

Optionally, before step 305, the RAN may further receive indication information from the SMF, the UPF, the PCF, or another network element. The indication information indicates to the RAN to perform transmission control on the first service data flow at a data packet group level of granularity. Therefore, the RAN performs step 305 based on the indication information.

Step 306: The RAN sends the data packet in the first data packet group to the first terminal device based on the remaining transmission time of the first data packet group, and correspondingly, the first terminal device receives the data packet in the first data packet group.

In other words, the RAN needs to transmit the data packet in the first data packet group to the first terminal device within the remaining transmission time of the first data packet group, so that a delay requirement of a service data flow can be met.

In an implementation of the method, the RAN may determine, based on the quantity information of the first data packet group and the remaining transmission time of the first data packet group, a modulation and coding scheme (MCS) corresponding to the first data packet group, and then, send the data packet in the first data packet group to the first terminal device based on the modulation and coding scheme corresponding to the first data packet group and the remaining transmission time of the first data packet group. For example, when a quantity of first data packet groups is large, but the remaining transmission time of the first data packet group is small, a high-level modulation and coding scheme may be determined, so that the RAN can increase a data packet transmission rate. It is ensured that the data packet in the first data packet group can be transmitted to the first terminal device within the remaining transmission time of the first data packet group.

When the RAN sends the first data packet group to the first terminal device in the remaining transmission time of the first data packet group, a data packet sent earlier has a sufficient remaining time, and a data packet sent later has less remaining time. Therefore, to enable a data packet (especially a data packet that is later in a time sequence) in the first data packet group to be successfully transmitted to the first terminal device within the remaining transmission time of the first data packet group, the RAN may divide the data packets in the first data packet group into two or more data packet subgroups in the time sequence, and then each data packet subgroup corresponds to one modulation and coding scheme, and a level of a modulation and coding scheme corresponding to a data packet subgroup whose time sequence is earlier is lower than a level of a modulation and coding scheme corresponding to a data packet subgroup whose time sequence is later. For example, two data packet subgroups are divided. The RAN determines, based on the quantity information of the first data packet group and the remaining transmission time of the first data packet group, a first modulation and coding scheme corresponding to a first portion of the data packets (namely, a first data packet subgroup) received earlier in the first data packet group and a second modulation and coding scheme corresponding to a second portion of the data packets (namely, a second data packet subgroup) received later in the first data packet group. A level of the first modulation and coding scheme is lower than a level of the second modulation and coding scheme. Then, the RAN sends the first portion of the data packets in the first data packet group to the first terminal device based on the first modulation and coding scheme and the remaining transmission time of the first data packet group, and sends the second portion of the data packets in the first data packet group to the first terminal device based on the second modulation and coding scheme and the remaining transmission time of the first data packet group.

Based on the foregoing step 304 to step 306, the RAN receives the data packet in the first data packet group, and obtains the first information, so that the RAN can perform a transmission control on the first data packet group based on the first information. Therefore, this approach implements transmission control at a data packet group level of granularity, and helps improve data packet transmission efficiency and user experience. In addition, a maximum available duration from a generation of the first data packet group to a transmission of the first data packet group to a terminal device is indicated based on the downlink transmission time window information of the first data packet group. Therefore, one data packet group can be sent to the terminal device in one time window, and a requirement of a low-delay service can be met. This further improves a service experience of a user.

To ensure synchronization of different terminal devices, for example, a same image is displayed on the different terminal devices at the same time, or a same audio is played at the same time, when the UPF receives, from the AF, data packet groups that need to be sent to the different terminal devices, the UPF determines downlink transmission time window information of the different data packet groups based on integrity transmission information carried in data packets in the different data packet groups, to ensure synchronization between the terminal devices. For ease of description, the following description uses synchronization between two terminal devices as an example for description.

Figure 4A:
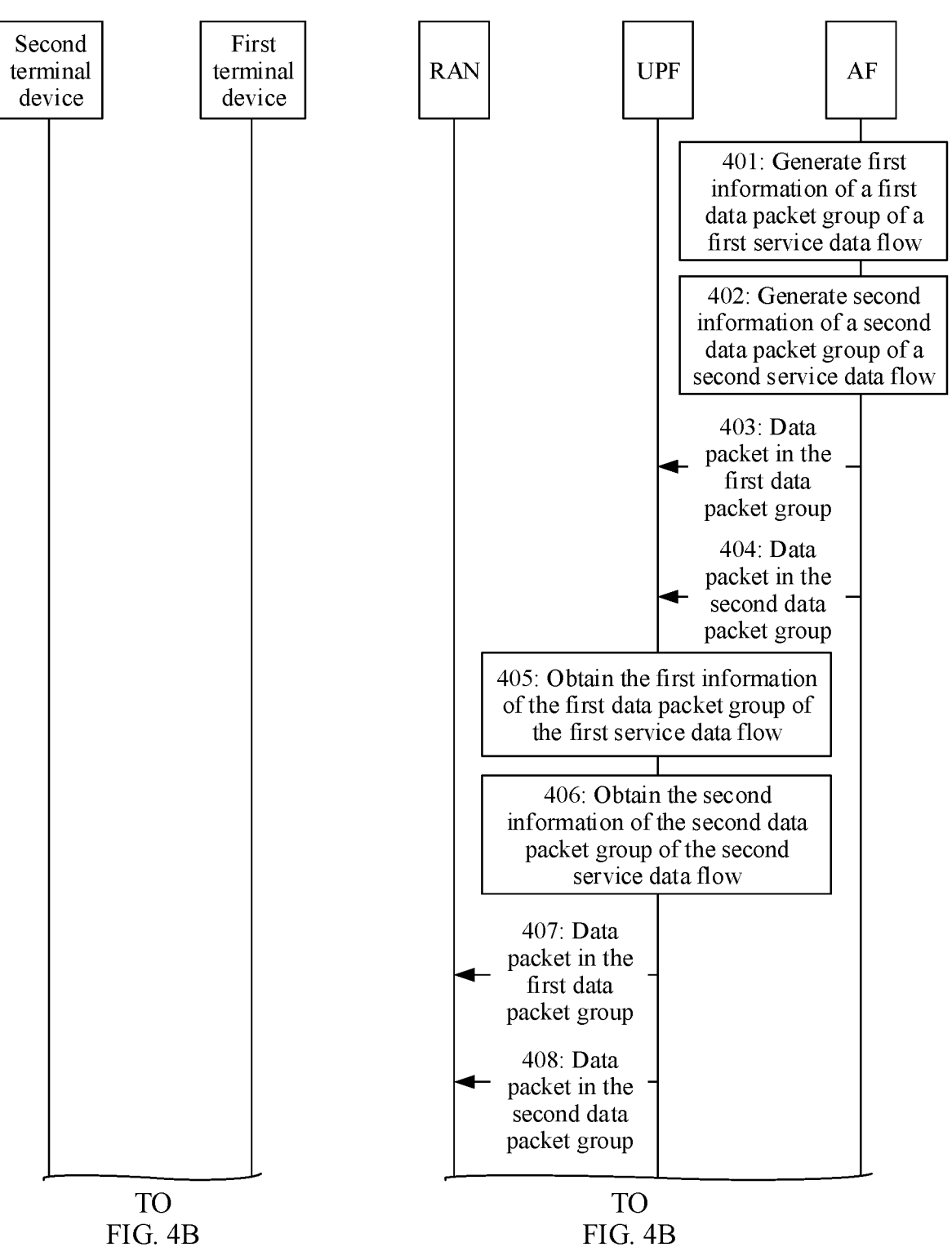
FIG. 4A and FIG. 4B are a schematic diagram of another service data flow transmission method according to an embodiment of this application.
Figure 4B:
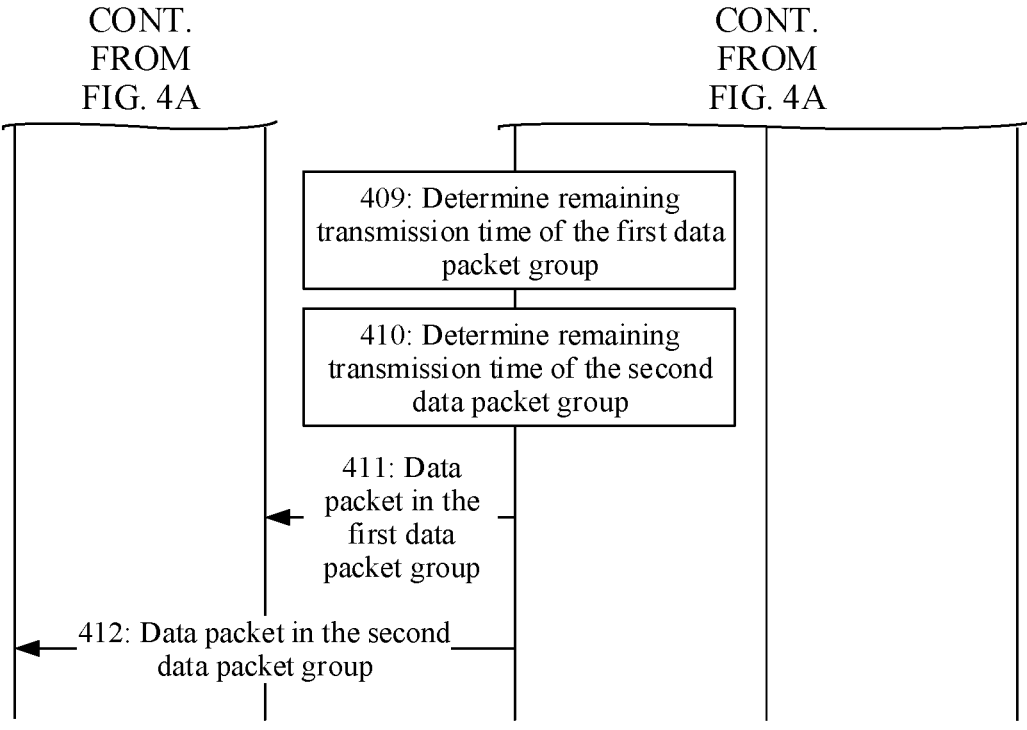

FIG. 4A and FIG. 4B are a schematic diagram of another service data flow transmission method according to an embodiment of this application. The method includes the following steps.

Step 401: An AF generates first information of a first data packet group of a first service data flow.

Step 401 is the same as step 301. For details, refer to the foregoing description.

Step 402: The AF generates second information of a second data packet group of a second service data flow.

Step 402 is similar to step 401. For details, refer to the foregoing description.

The second information includes an identifier of the second data packet group of the second service data flow, information indicating generation time of the second data packet group, and downlink transmission time window information of the second data packet group. Optionally, the second information further includes quantity information of the second data packet group. Meanings of parameters in the second information are similar to meanings of the parameters in the first information. For details, refer to the foregoing description. Details are not described again.

The second service data flow is a service data flow between the AF and a second terminal device. The service data flow includes one or more data packet groups, and one data packet group includes a plurality of data packets. Any data packet group in the second service data flow is referred to as a second data packet group, and the second data packet group corresponds to the first data packet group. For example, a data packet in the second data packet group and a data packet in the first data packet group carry the same data content.

Optionally, the identifier of the first data packet group is the same as the identifier of the second data packet group, the information indicating the generation time of the first data packet group is the same as the information indicating the generation time of the second data packet group, and the quantity information of the first data packet group is the same as the quantity information of the second data packet group. However, the downlink transmission time window information of the first data packet group is different from the downlink transmission time window information of the second data packet group.

Step 403: The AF sends a data packet in the first data packet group to a UPF, and correspondingly, the UPF receives the data packet in the first data packet group.

Step 403 is the same as step 302. For details, refer to the foregoing description.

Step 404: The AF sends a data packet in the second data packet group to the UPF, and correspondingly, the UPF receives the data packet in the second data packet group.

Step 404 is similar to step 403. For details, refer to the foregoing description.

Step 405: The UPF obtains the first information of the first data packet group of the first service data flow.

Step 401 is the same as step 303. For details, refer to the foregoing description.

Step 406: The UPF obtains the second information of the second data packet group of the second service data flow.

Step 406 is similar to step 405. For details, refer to the foregoing description.

Step 407: The UPF sends the data packet in the first data packet group to a RAN, and correspondingly, the RAN receives the data packet in the first data packet group.

Step 408: The UPF sends the data packet in the second data packet group to the RAN, and correspondingly, the RAN receives the data packet in the second data packet group.

An implementation of the method of step 407 and step 408 may be as follows: the UPF determines a scheduling priority of the first data packet group and a scheduling priority of the second data packet group based on the quantity information of the first data packet group, the quantity information of the second data packet group, the downlink transmission time window information of the first data packet group, and the downlink transmission time window information of the second data packet group. Then, the UPF sends the data packet in the first data packet group to the RAN based on the scheduling priority of the first data packet group, and sends the data packet in the second data packet group to the RAN based on the scheduling priority of the second data packet group. For example, when the scheduling priority of the first data packet group is higher than the scheduling priority of the second data packet group, the first data packet group is preferentially sent. For another example, when the scheduling priority of the second data packet group is higher than the scheduling priority of the first data packet group, the second data packet group is preferentially sent.

In an implementation of the method, the UPF may determine the scheduling priority of the first data packet group and the scheduling priority of the second data packet group according to the following method: the UPF determines a processing time of the first data packet group based on the quantity information of the first data packet group and a rate of the first service data flow, and determines the remaining transmission time of the first data packet group based on the processing time of the first data packet group, the information indicating the generation time of the first data packet group, and the downlink transmission time window information of the first data packet group. Similarly, the UPF determines a processing time of the second data packet group based on the quantity information of the second data packet group and a rate of the second service data flow, and determines remaining transmission time of the second data packet group based on the processing time of the second data packet group, the information indicating the generation time of the second data packet group, and the downlink transmission time window information of the second data packet group. Then, the UPF determines the scheduling priority of the first data packet group and the scheduling priority of the second data packet group based on the remaining transmission time of the first data packet group and the remaining transmission time of the second data packet group. For example, if the remaining transmission time of the first data packet group is greater than the remaining transmission time of the second data packet group, the scheduling priority of the first data packet group is lower than the scheduling priority of the second data packet group. For another example, when the remaining transmission time of the first data packet group is less than the remaining transmission time of the second data packet group, the scheduling priority of the first data packet group is higher than the scheduling priority of the second data packet group.

For example, for the first data packet group:

The information indicating the generation time of the first data packet group indicates that a generation moment of the first data packet group is P1, and a time for processing the first data packet group by the UPF is T1. The downlink transmission time window information of the first data packet group indicates that maximum available duration from generation of the first data packet group to transmission of the first data packet group to a first terminal device is T2, and a moment at which the UPF receives the first data packet group is P2. Therefore, the remaining transmission time of the first data packet group determined by the UPF is $T2-T1-(P2-P1)$. It should be noted that T1 and T2 are duration, and P1 and P2 are time points.

For example, for the second data packet group:

The information indicating the generation time of the second data packet group indicates that a generation moment of the second data packet group is P3, and a time for processing the second data packet group by the UPF is T3. The downlink transmission time window information of the second data packet group indicates that a maximum available duration from a generation of the second data packet group to a transmission of the second data packet group to a second terminal device is T4, and a moment at which the UPF receives the second data packet group is P4. Therefore, the remaining transmission time of the second data packet group determined by the UPF is $T4-T3-(P4-P3)$. It should be noted that T3 and T4 are duration, and P3 and P4 are time points.

It should be noted that the processing time for processing the first data packet group inside the UPF is removed from the remaining transmission time of the first data packet group herein. In other words, the remaining transmission time of the first data packet group represents the longest available duration from the UPF sending the first data packet group to the first terminal device receiving the first data packet group. Similarly, processing time for processing the second data packet group inside the UPF is removed from the remaining transmission time of the second data packet group. In other words, the remaining transmission time of the second data packet group represents the longest available duration from the UPF sending the second data packet group to the second terminal device receiving the second data packet group.

Step 409: The RAN determines the remaining transmission time of the first data packet group based on the information indicating the generation time of the first data packet group and the downlink transmission time window information of the first data packet group.

Step 409 is the same as step 305. For details, refer to the foregoing description.

Step 410: The RAN determines the remaining transmission time of the second data packet group based on the information indicating the generation time of the second data packet group and the downlink transmission time window information of the second data packet group.

Step 410 is similar to step 409. For details, refer to the foregoing description.

Step 411: The RAN sends the data packet in the first data packet group to the first terminal device based on the remaining transmission time of the first data packet group, and correspondingly, the first terminal device receives the data packet in the first data packet group.

Step 412: The RAN sends the data packet in the second data packet group to the second terminal device based on the remaining transmission time of the second data packet group, and correspondingly, the second terminal device receives the data packet in the second data packet group.

An implementation of the method of step 407 and step 408 may be as follows: the RAN determines the scheduling priority of the first data packet group and the scheduling priority of the second data packet group based on the remaining transmission time of the first data packet group and the remaining transmission time of the second data packet group, then sends the data packet in the first data packet group to the first terminal device based on the scheduling priority of the first data packet group and the remaining transmission time of the first data packet group, and sends the data packet in the second data packet group to the second terminal device based on the scheduling priority of the second data packet group and the remaining transmission time of the second data packet group. For example, when the scheduling priority of the first data packet group is higher than the scheduling priority of the second data packet group, the first data packet group is preferentially sent. For another example, when the scheduling priority of the second data packet group is higher than the scheduling priority of the first data packet group, the second data packet group is preferentially sent.

It should be noted that there is no strict requirement on an execution sequence between some of the foregoing steps (such as step 401, step 403, step 405, step 407, step 409, and step 411) related to the first data packet group and some of the foregoing steps (such as step 402, step 404, step 406, step 408, step 410, and step 412) related to the second data packet group.

Based on the foregoing solution, when a plurality of terminal devices have different processing capabilities, the plurality of terminal devices may be controlled by the UPF and the RAN, so that synchronization between the plurality of terminal devices can be maintained, thereby improving service experience of a user. In addition, one data packet group may be sent to a terminal device in one time window, so that a requirement of a low-delay service can be met, and service experience of the user can be further improved.

As an example, the embodiment shown in FIG. 3 is described below with reference to the specific embodiments shown in FIG. 5 and FIG. 6.

Figure 5:
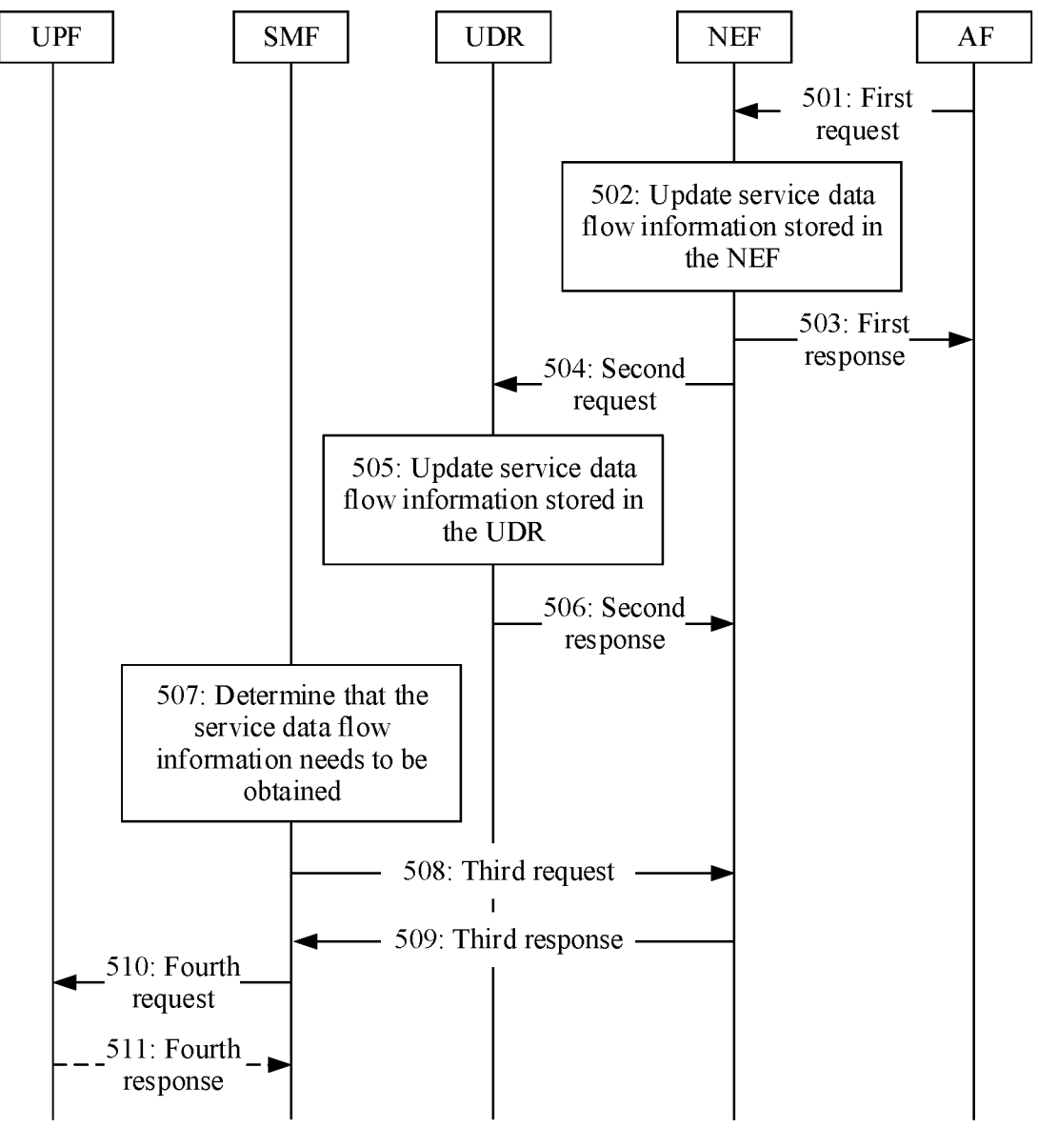
FIG. 5 is a schematic diagram of another service data flow transmission method according to an embodiment of this application.

FIG. 5 is a schematic diagram of another service data flow transmission method according to an embodiment of this application. The method provides a process of configuring service data flow information. Specifically, an AF provides the service data flow information for a network by using a NEF. The service data flow information includes an application identifier, identification information of a service data flow, and requirement information of the service data flow.

The application identifier is used to identify a specific service such as media, and may be a specified character.

The identification information of the service data flow includes but is not limited to one or both of the following information: an IP triplet and a uniform resource locator (URL). The IP triplet includes an IP address, a port number, and a protocol number of the AF.

The requirement information of the service data flow includes but is not limited to one or more of the following information: a bitrate, a packet error rate (PER), and a packet delay budget (PDB).

Optionally, the requirement information of the service data flow further includes field description information. The field description information includes identifier field description information of a data packet group, generation time field description information of the data packet group, and downlink transmission time window field description information of the data packet group, and may further include quantity field description information of the data packet group. The identifier field description information of the data packet group indicates that an identifier field of the data packet group is used to carry an identifier of the data packet group. The generation time field description information of the data packet group indicates that a generation time field of the data packet group is used to carry information indicating generation time of the first data packet group. The downlink transmission time window field description information of the data packet group indicates that a downlink transmission time window field of the data packet group is used to carry downlink transmission time window information of the data packet group. The quantity field description information of the data packet group indicates that a quantity field of the data packet group is used to carry quantity information of the data packet group.

The method includes the following steps.

Step 501: The AF sends a first request to the NEF, and correspondingly, the NEF may receive the first request.

The first request carries newly added service data flow information or updated service data flow information.

In an implementation of the method, when the AF prepares to add the new service data flow information, the AF sends the first request to the NEF. The first request may be a service data flow create request, for example, may be specifically a PFDManagement_Create request. The service data flow create request carries the newly added service data flow information.

In another implementation of the method, when the AF prepares to update existing service data flow information, the AF sends the first request to the NEF. The first request may be a service data flow update request, for example, may be a PFDManagement_Update request. The service data flow update request carries the updated service data flow information.

Step 502: The NEF updates service data flow information stored in the NEF.

For example, the NEF first determines whether the first request is allowed, and when the first request is allowed, the NEF updates the service data flow information stored in the NEF. For example, when the first request carries the newly added service data flow information, the NEF updates, based on the newly added service data flow information, the service data flow information stored in the NEF. For another example, when the first request carries the updated service data flow information, the NEF updates, based on the updated service data flow information, the service data flow information stored in the NEF.

Step 503: The NEF sends a first response to the AF, and correspondingly, the AF may receive the first response.

The first response is used to notify the AF that the request is successfully processed.

Certainly, when the NEF determines that the first request is not allowed or the NEF fails to update the service data flow information in step 502, the first response is used to notify the AF that the request fails to be processed.

The first response may be a service data flow create response or a service data flow update response.

Step 504: The NEF sends a second request to a UDR, and correspondingly, the UDR may receive the second request.

The second request carries newly added service data flow information or updated service data flow information.

In an implementation of the method, when the NEF prepares to add the new service data flow information, the NEF sends the second request to the UDR. The second request may be a data management create request (e.g., DM_Create Request), and the data management create request carries the newly added service data flow information.

In another implementation of the method, when the NEF prepares to update the existing service data flow information, the NEF sends the second request to the UDR. The second request may be a data management update request (e.g., DM_Update Request), and the data management update request carries the updated service data flow information.

Step 505: The UDR updates service data flow information stored in the UDR.

For example, when the second request carries the newly added service data flow information, the UDR updates, based on the newly added service data flow information, the service data flow information stored in the UDR. For another example, when the second request carries the updated service data flow information, the UDR updates, based on the updated service data flow information, the service data flow information stored in the UDR.

Step 506: The UDR sends a second response to the NEF, and correspondingly, the NEF may receive the second response.

The second response is used to notify the NEF that the request is successfully processed.

Certainly, when the UDR fails to update the service data flow information in step 505, the second response is used to notify the NEF that the request fails to be processed.

The second response may be a data management create response (e.g., DM_Create Response) or a data management update response (e.g., DM_Update Response).

Step 507: An SMF determines that the service data flow information needs to be obtained.

For example, a timer is set on the SMF, and after each time specified duration expires, the SMF is triggered to obtain the service data flow information.

That an SMF determines that the service data flow information needs to be obtained may include determining that the newly added service data flow information needs to be obtained, or determining that the updated service data flow information needs to be obtained.

Step 508: The SMF sends a third request to the NEF, and correspondingly, the NEF may receive the third request.

The third request is used to request to obtain the service data flow information.

For example, the third request may be a PFDManagement_Fetch request.

Step 509: The NEF sends a third response to the SMF, and correspondingly, the SMF may receive the third response.

The third response carries the newly added service data flow information or the updated service data flow information.

For example, the third response may be a PFDManagement_Fetch response.

After receiving the newly added service data flow information or the updated service data flow information, the SMF stores the newly added service data flow information or the updated service data flow information in the SMF.

In step 507 to step 509, the SMF actively requests to obtain the service data flow information from the NEF. In another implementation of the method, alternatively, after receiving the newly added service data flow information or the updated service data flow information, the NEF actively reports the newly added service data flow information or the updated service data flow information to the SMF. Alternatively, in another implementation of the method, the SMF may actively request to obtain the service data flow information from the UDR.

Step 510: The SMF sends a fourth request to a UPF, and correspondingly, the UPF may receive the fourth request.

The fourth request carries the newly added service data flow information or the updated service data flow information.

For example, the fourth request may be a PFD management request.

The UPF may perform data flow detection based on the newly added service data flow information or the updated service data flow information, to identify a new service data flow.

In the foregoing embodiments, the AF provides the newly added service data flow information or the updated service data flow information, and updates the information to the NEF, the UDR, or the SMF in the network. In an implementation, the update may be performed only on one or more of the NEF, the UDR, and the SMF in the network, or may be performed on another network element in the network, for example, an AMF or a PCF. In addition, the service data flow information is further updated to the UPF, so that the UPF can start to detect the new service data flow.

Step 511: The UPF sends a fourth response to the SMF, and correspondingly, the SMF may receive the fourth response.

This step is optional.

Based on the foregoing embodiment, the network may be enabled to obtain and configure specified service data flow information, so that a corresponding service data flow can be detected, and data flow transmission may be subsequently performed based on the service data flow information.

Figure 6:
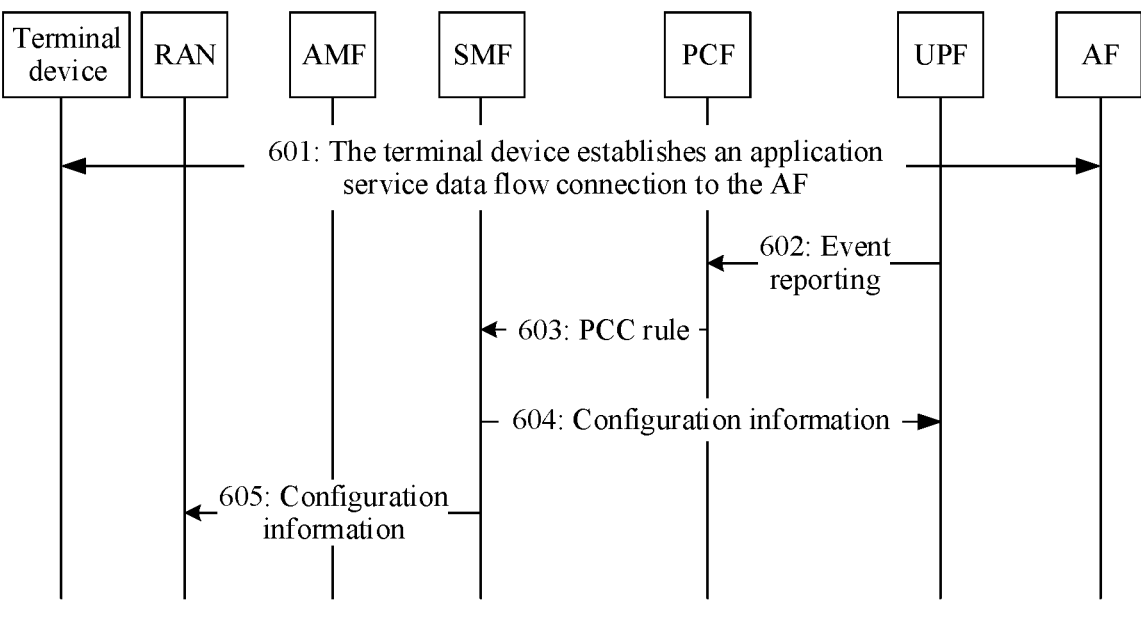
FIG. 6 is a schematic diagram of another service data flow transmission method according to an embodiment of this application.

FIG. 6 is a schematic diagram of another service data flow transmission method according to an embodiment of this application. The method includes the following steps:

Step 601: A terminal device establishes an application service data flow connection to an AF.

The terminal device establishes the application service data flow connection to the AF. For example, an application in the terminal device may establish an application layer service data flow connection to an application in the AF. Optionally, the application layer service data flow connection may be established by using an RTP protocol.

An IP triplet or a URL of a service data flow is consistent with an IP triplet or a URL in service data flow information pre-provided by the AF for a network. For example, when the AF provides the service data flow information for the network according to the method in the embodiment in FIG. 5, the IP triplet or the URL of the service data flow in step 601 is consistent with the IP triplet or the URL in the service data flow information in the embodiment in FIG. 5.

Step 602: A UPF performs packet detection according to a configured packet detection rule, and when detecting a service data flow corresponding to a specified service, the UPF sends an event report to a PCF, where the event report carries a detected packet data flow description (PFD) identifier.

For example, when service data flow information corresponding to a service is preconfigured on the UPF (for example, configured through step 510 in the embodiment in FIG. 5), the UPF may use an IP triplet or a URL in the service data flow information as a parameter of the packet detection rule, to perform packet detection.

In another implementation, the UPF may also send the event report to an SMF, and then the SMF sends the event report to the PCF.

Step 603: The PCF sends a policy and charging control (PCC) rule to the SMF, and correspondingly, the SMF may receive the PCC rule.

The PCF may first obtain the service data flow information from a network element such as the UDR or the SMF, and then generate the PCC rule based on the service data flow information. When the service is transmitted by using a plurality of data flows, the PCF generates a PCC rule for each service data flow, and then the PCF sends the PCC rule to the SMF. Each PCC rule includes a QoS class identifier (QCI) of a QoS flow and integrity transmission policy information. The integrity transmission policy information includes a service data flow detection rule and indication information, and the indication information indicates transmission control at data packet group granularity.

In an implementation of the method, in this step, the PCF may send an SMF initiated SM_Policy association modification request to the SMF, where the SMF initiated SM_Policy association modification request carries the PCC rule.

Step 604: The SMF sends configuration information of the service data flow to the UPF, and correspondingly, the UPF may receive the configuration information of the service data flow.

The configuration information includes indication information, and the indication information indicates to the UPF to perform transmission control at data packet group granularity on the service data flow. The indication information carried in the configuration information is determined by the SMF based on the integrity transmission policy information received from the PCC rule.

For example, the SMF may send the configuration information of the service data flow to the UPF by using an N4 message (such as an N4 PDU establishment modification request or an N4 PDU session modification request).

After receiving the configuration information, the UPF performs a transmission control at the data packet group at a level of granularity on the service data flow based on the indication information in the configuration information. For an implementation of the method, refer to related descriptions in the embodiment corresponding to FIG. 3. Details are not described herein again.

Step 605: The SMF sends the configuration information of the service data flow to a RAN by using an AMF, and correspondingly, the RAN may receive the configuration information of the service data flow.

The configuration information includes indication information, and the indication information indicates to perform transmission control at a data packet group level of granularity on the service data flow. The indication information carried in the configuration information is determined by the SMF based on the integrity transmission policy information received from the PCC rule.

After receiving the configuration information, the RAN performs transmission control at the data packet group level of granularity on the service data flow based on the indication information in the configuration information. For an implementation of the method, refer to related descriptions in the embodiment corresponding to FIG. 3. Details are not described herein again.

Based on the foregoing embodiment, after the application in the terminal device establishes the application service data flow connection to the AF, the configuration information of the service data flow may be sent to the RAN and the UPF, and the RAN and the UPF perform scheduling and transmission control at the data packet group level of granularity on the service data flow based on the configuration information, so that transmission efficiency of the service data flow can be improved.

The foregoing description describes the solutions provided in this application from a perspective of interaction between network elements. It may be understood that, to implement the foregoing functions, each network element includes a corresponding hardware structure and/or software module for executing each function. A person of ordinary skill in the art should easily be aware that, in combination with the examples described in embodiments disclosed in this specification, units and algorithm steps may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

It may be understood that, in the foregoing method embodiments, steps or operations correspondingly implemented by a network device may alternatively be implemented by a component (for example, a chip or a circuit) configured in the network device, steps or operations correspondingly implemented by an access network device may alternatively be implemented by a component (for example, a chip or a circuit) configured in the access network device, and steps or operations correspondingly implemented by an application function network element may alternatively be implemented by a component (for example, a chip or a circuit) configured in the application function network element.

Figure 7:
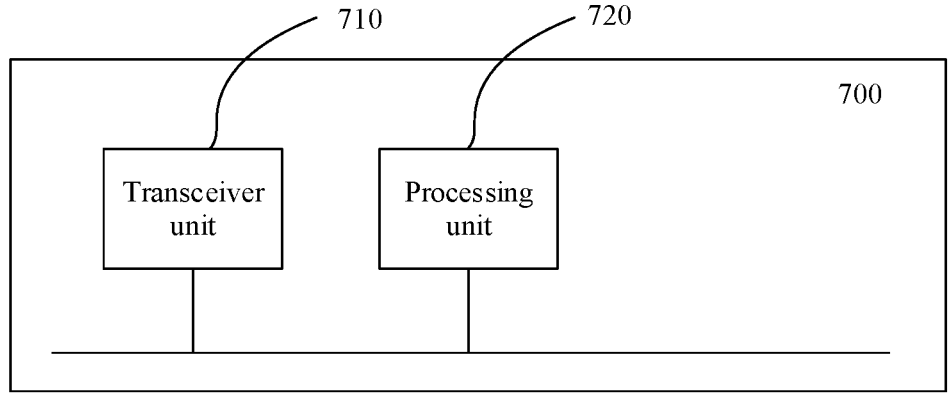
FIG. 7 is a schematic diagram of a communication apparatus according to an embodiment of this application.

FIG. 7 is a schematic diagram of a communication apparatus according to an embodiment of this application. The apparatus is configured to implement steps performed by a corresponding network device, a corresponding access network device, or a corresponding application function network element in the foregoing embodiment. As shown in FIG. 7, the apparatus 700 includes a transceiver unit 710 (e.g., transceiver circuit) and a processing unit 720.

In a first embodiment, the communication apparatus is a network device or a chip used in a network device.

The processing unit 720 is configured to obtain, from one or more data packets received by using the transceiver unit 710, an identifier of a first data packet group, information indicating a generation time of the first data packet group, and downlink transmission time window information of the first data packet group. The one or more data packets are data packets in the first data packet group of a first service data flow, the first service data flow includes at least two data packet groups, and the first data packet group is one of the at least two data packet groups. The transceiver unit 710 is configured to send a data packet in the first data packet group to an access network device. The data packet in the first data packet group is sent together with the identifier of the first data packet group, and at least one data packet in the first data packet group is sent together with the identifier of the first data packet group, the information indicating the generation time of the first data packet group, and the downlink transmission time window information of the first data packet group.

In a second embodiment, the communication apparatus is an access network device or a chip used in an access network device.

The transceiver unit 710 is configured to obtain information indicating generation time of a first data packet group and downlink transmission time window information of the first data packet group from at least one received data packet, where the at least one data packet is a data packet in the first data packet group of a first service data flow, the first service data flow includes at least two data packet groups, and the first data packet group is one of the at least two data packet groups. The processing unit 720 is configured to determine remaining transmission time of the first data packet group based on the information indicating the generation time of the first data packet group and the downlink transmission time window information of the first data packet group, and is configured to send a data packet in the first data packet group to a terminal device by using the transceiver unit 710 based on the remaining transmission time of the first data packet group.

In a third embodiment, the communication apparatus is an application function network element or a chip used in an application function network element.

The processing unit 720 is configured to generate an identifier of a first data packet group of a first service data flow, information indicating generation time of the first data packet group, and downlink transmission time window information of the first data packet group, where the first service data flow includes at least two data packet groups, and the first data packet group is one of the at least two data packet groups. The transceiver unit 710 is configured to send a data packet in the first data packet group to a network device, where the data packet in the first data packet group is sent together with the identifier of the first data packet group, and one or more data packets in the first data packet group carry the identifier of the first data packet group, the information indicating the generation time of the first data packet group, and the downlink transmission time window information of the first data packet group.

Optionally, the communication apparatus 700 may further include a storage unit (e.g., storage circuit). The storage unit is configured to store data or instructions (which may also be referred to as code or a program). The foregoing units may interact with or be coupled to the storage unit, to implement a corresponding method or function. For example, the processing unit 720 may read the data or the instructions in the storage unit, so that the communication apparatus implements the method in the foregoing embodiments.

It should be understood that division into units in the apparatus is merely a logical function division. During actual implementation, all or some of the units may be integrated into one physical entity or may be physically separated. In addition, all the units in the apparatus may be implemented in a form of software invoked by a processing element, or may be implemented in a form of hardware. Alternatively, some units may be implemented in a form of software invoked by a processing element, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of the integrated circuit forms. For another example, when the unit in the apparatus may be implemented by scheduling a program by a processing element, the processing element may be a general-purpose processor, for example, a central processing unit (CPU) or another processor that can invoke the program. For still another example, the units may be integrated and implemented in a form of a system-on-a-chip (SOC).

The transceiver unit 710 is an interface circuit of the apparatus, and is configured to send a signal to another apparatus or receive a signal from another apparatus. For example, when the apparatus is implemented in a chip manner, the transceiver unit 710 is an interface circuit used by the chip to send a signal to another chip or apparatus, or an interface circuit used by the chip to receive a signal from another chip or apparatus.

Figure 8:
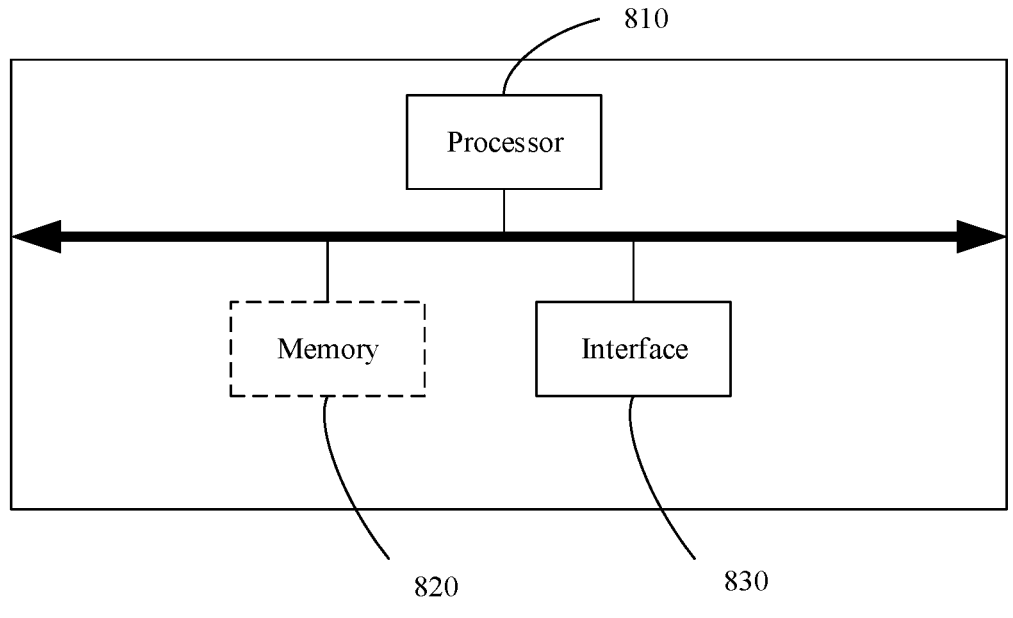
FIG. 8 is a schematic diagram of another communication apparatus according to an embodiment of this application.

FIG. 8 is a schematic diagram of a communication apparatus according to an embodiment of this application. The communication apparatus is configured to implement operations corresponding to the network device, the access network device, or the application function network element in the foregoing embodiments. As shown in FIG. 8, the communication apparatus includes a processor 810 and an interface 830. Optionally, the communication apparatus further includes a memory 820. The interface 830 is used to communicate with another device.

The method performed by the network device, the access network device, or the application function network element in the foregoing embodiments may be implemented by the processor 810 by invoking a program stored in a memory (which may be the memory 820 in the network device, the access network device, or the application function network element, or may be an external memory). In other words, the network device, the access network device, or the application function network element may include the processor 810. The processor 810 invokes a program in the memory to perform the method performed by the network device, the access network device, or the application function network element in the foregoing method embodiments. The processor herein may be an integrated circuit having a signal processing capability, for example, a CPU. The network device, the access network device, or the application function network element may be implemented by using one or more integrated circuits configured to implement the foregoing methods, for example, one or more ASICs, one or more microprocessors DSPs, one or more FPGAs, or a combination of at least two of the integrated circuit forms. Alternatively, the foregoing implementations may be combined.

Specifically, functions/implementation processes of the transceiver unit 710 and the processing unit 720 in FIG. 7 may be implemented by the processor 810 in the communication apparatus 800 shown in FIG. 8 by invoking computer-executable instructions stored in the memory 820. Alternatively, functions/implementation processes of the processing unit 720 in FIG. 7 may be implemented by the processor 810 in the communication apparatus 800 shown in FIG. 8 by invoking computer-executable instructions stored in the memory 820, and functions/implementation processes of the transceiver unit 710 in FIG. 7 may be implemented by using the interface 830 in the communication apparatus 800 shown in FIG. 8.

A person of ordinary skill in the art may understand that various numbers such as "first" and "second" in this application are merely used for differentiation for ease of description, and are not used to limit the scope of embodiments of this application or represent a sequence. The term "and/or" describes an association relationship between associated objects and indicates that three relationships may exist. For example, A and/or B may indicate the following three cases: Only A exists, both A and B exist, and only B exists. The character "I" generally indicates an "or" relationship between associated objects. "At least one" means one or more. "At least two" means two or more. "At least one", "any one", or a similar expression thereof indicates any combination of the items, and includes a singular item (piece) or any combination of plural items (pieces). For example, at least one of a, b, or c may indicate: a, b, c, a and b, a and c, b and c, or a, b, and c, where a, b, and c may be singular or plural. The term "a plurality of" means two or more, and another quantifier is similar to this.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

All or some of the foregoing embodiments may be implemented by using software, hardware, firmware, or any combination thereof. When software is used to implement the foregoing embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an erasable programmable ROM (EPROM), an electrically EPROM (EEPROM), a register, a hard disk, a removable magnetic disk, a CD-ROM, or a storage medium of any other form in the art. For example, the storage medium may connect to a processor, so that the processor may read information from the storage medium and write information to the storage medium. Optionally, the storage medium may alternatively be integrated into a processor. The processor and the storage medium may be disposed in the ASIC.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

In one or more example designs, the functions described in this application may be implemented by using hardware, software, firmware, or any combination thereof. If the functions are implemented by software, these functions may be stored in a computer-readable medium or are transmitted to a computer-readable medium in a form of one or more instructions or code. The computer-readable medium includes a computer storage medium and a communication medium that enables a computer program to move from one place to another. The storage medium may be an available medium that may be accessed by any general-purpose or dedicated computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and the disc include a compact disc, a laser disc, an optical disc, a digital versatile disc (DVD for short), a floppy disk, and a Blu-ray disc. The disc usually copies data in a magnetic manner, and the disk usually optically copies data in a laser manner. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that facilitates transmission of a computer program from one place to another. The storage medium may be any available medium accessible to a general-purpose or a dedicated computer.

In the foregoing implementations, the objectives, technical solutions, and beneficial effects of this application are further described in detail. It should be understood that the foregoing descriptions are merely implementations of this application, but are not intended to limit the protection scope of this application. Any modification, equivalent replacement, improvement, or the like made based on the technical solutions of this application shall fall within the protection scope of this application. According to the foregoing description of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs and may also be extended to a maximum scope that is consistent with the principles and disclosed new features of this application.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A service data flow transmission method, comprising:
obtaining, by a network device from one or more received data packets in a first data packet group of a first service data flow, an identifier of the first data packet group, information indicating a generation time of the first data packet group, quantity information of the first data packet group, and downlink transmission time window information of the first data packet group;

obtaining, by the network device from one or more received data packets in a second data packet group of a second service data flow, an identifier of the second data packet group, information indicating a generation time of the second data packet group, quantity information of the second data packet group, and downlink transmission time window information of the second data packet group;

determining, by the network device, a scheduling priority of the first data packet group based on the quantity information of the first data packet group, the quantity information of the second data packet group, the information indicating the generation time of the first data packet group, the information indicating the generation time of the second data packet group, the downlink transmission time window information of the first data packet group, and the downlink transmission time window information of the second data packet group; and sending, by the network device, a data packet in the first data packet group to an access network device based on the scheduling priority of the first data packet group.

2. The method according to claim 1, further comprising:
receiving, by the network device, the one or more data packets from an application function network element.

3. The method according to claim 1, further comprising:
caching, by the network device, N data packets in the first data packet group, wherein N is an integer greater than 1; and the sending, by the network device, the data packet in the first data packet group to the access network device comprises:

obtaining, by the network device, the N cached data packets, and sending the N data packets to the access network device.

4. The method according to claim 3, further comprising:
determining, by the network device based on the quantity information of the first data packet group, a quantity N of cached data packets in the first data packet group.

5. The method according to claim 3, further comprising:
determining, by the network device, cache time of the N data packets based on the information indicating the generation time of the first data packet group and the downlink transmission time window information of the first data packet group.

6. The method according to claim 1, wherein the determining, by the network device, the scheduling priority of the first data packet group based on the quantity information of the first data packet group, the quantity information of the second data packet group, the information indicating the generation time of the first data packet group, the information indicating the generation time of the second data packet group, the downlink transmission time window information of the first data packet group, and the downlink transmission time window information of the second data packet group comprises:

determining, by the network device, a processing time of the first data packet group based on the quantity information of the first data packet group and a rate of the first service data flow; and determining a remaining transmission time of the first data packet group based on the processing time of the first data packet group, the information indicating the generation time of the first data packet group, and the downlink transmission time window information of the first data packet group;

determining, by the network device, a processing time of the second data packet group based on the quantity information of the second data packet group and a rate of the second service data flow; and determining a remaining transmission time of the second data packet group based on the processing time of the second data packet group, the information indicating the generation time of the second data packet group, and the downlink transmission time window information of the second data packet group; and determining, by the network device, the scheduling priority of the first data packet group based on the remaining transmission time of the first data packet group and the remaining transmission time of the second data packet group.

7. The method according to claim 1, further comprising:

receiving, by the network device, indication information, wherein the indication information indicates the network device to perform transmission control on the first service data flow at a data packet group level of granularity.

8. A service data flow transmission method, comprising:

obtaining, by an access network device, information indicating a generation time of a first data packet group and downlink transmission time window information of the first data packet group from one or more received data packets in the first data packet group of a first service data flow;

determining, by the access network device, a remaining transmission time of the first data packet group based on the information indicating the generation time of the first data packet group and the downlink transmission time window information of the first data packet group;

obtaining, by the access network device from one or more received data packets in a second data packet group of a second service data flow, information indicating a generation time of the second data packet group and downlink transmission time window information of the second data packet group; and determining, by the access network device, remaining transmission time of the second data packet group based on the information indicating the generation time of the second data packet group and the downlink transmission time window information of the second data packet group;

determining, by the access network device, a scheduling priority of the first data packet group based on the remaining transmission time of the first data packet group and the remaining transmission time of the second data packet group; and sending, by the access network device, a data packet in the first data packet group to a terminal device based on the remaining transmission time of the first data packet group and the scheduling priority of the first data packet group.

9. The method according to claim 8, further comprising:

obtaining, by the access network device, quantity information of the first data packet group from the one or more received data packets in the first data packet group; and determining, by the access network device based on the quantity information of the first data packet group and the remaining transmission time of the first data packet group, a modulation and coding scheme corresponding to the first data packet group, wherein the sending, by the access network device, the data packet in the first data packet group to the terminal device based on the remaining transmission time of the first data packet group comprises:

sending, by the access network device, the data packet in the first data packet group to the terminal device based on the modulation and coding scheme corresponding to the first data packet group and the remaining transmission time of the first data packet group.

10. The method according to claim 9, wherein the determining, by the access network device based on the quantity information of the first data packet group and the remaining transmission time of the first data packet group, the modulation and coding scheme corresponding to the first data packet group comprises:

determining, by the access network device based on the quantity information of the first data packet group and the remaining transmission time of the first data packet group, a first modulation and coding scheme corresponding to a first portion of data packets received earlier in the first data packet group and a second modulation and coding scheme corresponding to a second portion of the data packets received later in the first data packet group, wherein a level of the first modulation and coding scheme is lower than a level of the second modulation and coding scheme; and the sending, by the access network device, the data packet in the first data packet group to the terminal device based on the modulation and coding scheme corresponding to the first data packet group and the remaining transmission time of the first data packet group comprises:

sending, by the access network device, the first portion of the data packets in the first data packet group to the terminal device based on the first modulation and coding scheme and the remaining transmission time of the first data packet group; and sending, by the access network device, the second portion of the data packets in the first data packet group to the terminal device based on the second modulation and coding scheme and the remaining transmission time of the first data packet group.

11. The method according to claim 8, further comprising:

receiving, by the access network device, indication information, wherein the indication information indicates the access network device to perform transmission control at a data packet group level of granularity on the first service data flow.

12. A communication apparatus, comprising at least one processor coupled to at least one memory for storing instructions and configured to execute the instructions to cause the apparatus to:

obtain, from one or more received data packets in a first data packet group of a first service data flow, an identifier of the first data packet group, information indicating a generation time of the first data packet group, quantity information of the first data packet group, and downlink transmission time window information of the first data packet group;

obtain, from one or more received data packets in a second data packet group of a second service data flow, an identifier of the second data packet group, information indicating a generation time of the second data packet group, quantity information of the second data packet group, and downlink transmission time window information of the second data packet group;

determine, a scheduling priority of the first data packet group based on the quantity information of the first data packet group, the quantity information of the second data packet group, the information indicating the generation time of the first data packet group, the information indicating the generation time of the second data packet group, the downlink transmission time window information of the first data packet group, and the downlink transmission time window information of the second data packet group; and send a data packet in the first data packet group to an access network device based on the scheduling priority of the first data packet group.

13. The communication apparatus according to claim 12, wherein the at least one processor is configured to execute the instructions to cause the apparatus further to:

receive the one or more data packets from an application function network element.

14. The communication apparatus according to claim 12, wherein the at least one processor is configured to execute the instructions to cause the apparatus further to:

cache N data packets in the first data packet group, wherein N is an integer greater than 1; and the sending of the data packet in the first data packet group to the access network device comprises:

obtaining the N cached data packets, and sending the N data packets to the access network device.

15. The communication apparatus according to claim 14, wherein the at least one processor is configured to execute the instructions to cause the apparatus further to:

determine, based on the quantity information of the first data packet group, a quantity N of cached data packets in the first data packet group.

16. The communication apparatus according to claim 14, wherein the at least one processor is configured to execute the instructions to cause the apparatus further to:

determine a cache time of the N data packets based on the information indicating the generation time of the first data packet group and the downlink transmission time window information of the first data packet group.

17. The communication apparatus according to claim 12, wherein the determining of the scheduling priority of the first data packet group based on the quantity information of the first data packet group, the quantity information of the second data packet group, the information indicating the generation time of the first data packet group, the information indicating the generation time of the second data packet group, the downlink transmission time window information of the first data packet group, and the downlink transmission time window information of the second data packet group comprises:

determining a processing time of the first data packet group based on the quantity information of the first data packet group and a rate of the first service data flow; and determining a remaining transmission time of the first data packet group based on the processing time of the first data packet group, the information indicating the generation time of the first data packet group, and the downlink transmission time window information of the first data packet group;

determining a processing time of the second data packet group based on the quantity information of the second data packet group and a rate of the second service data flow; and determining a remaining transmission time of the second data packet group based on the processing time of the second data packet group, the information indicating the generation time of the second data packet group, and the downlink transmission time window information of the second data packet group; and determining the scheduling priority of the first data packet group based on the remaining transmission time of the first data packet group and the remaining transmission time of the second data packet group.

18. A communication apparatus, comprising at least one processor coupled to at least one memory for storing instructions and configured to execute the instructions to cause the apparatus to:

obtain information indicating a generation time of a first data packet group and downlink transmission time window information of the first data packet group from one or more first received data packets in the first data packet group of a first service data flow;

determine a remaining transmission time of the first data packet group based on the information indicating the generation time of the first data packet group and the downlink transmission time window information of the first data packet group;

obtain, from one or more received second data packets in a second data packet group of a second service data flow, information indicating a generation time of the second data packet group and downlink transmission time window information of the second data packet group; and determine, remaining transmission time of the second data packet group based on the information indicating the generation time of the second data packet group and the downlink transmission time window information of the second data packet group;

determine, a scheduling priority of the first data packet group based on the remaining transmission time of the first data packet group and the remaining transmission time of the second data packet group; and send a data packet in the first data packet group to a terminal device based on the remaining transmission time of the first data packet group and the scheduling priority of the first data packet group.

* * * * *